(12) United States Patent
Avganim

(10) Patent No.: US 12,196,011 B2
(45) Date of Patent: Jan. 14, 2025

(54) COMPUTER SECURITY LOCKS AND SYSTEM THEREFOR

(71) Applicant: Meir Avganim, Gealya (IL)

(72) Inventor: Meir Avganim, Gealya (IL)

( * ) Notice: Subject to any disclaimer, the term of this patent is extended or adjusted under 35 U.S.C. 154(b) by 202 days.

(21) Appl. No.: 18/086,965

(22) Filed: Dec. 22, 2022

(65) Prior Publication Data

US 2023/0203850 A1 Jun. 29, 2023

Related U.S. Application Data

(60) Provisional application No. 63/311,415, filed on Feb. 17, 2022, provisional application No. 63/294,408, filed on Dec. 29, 2021.

(51) Int. Cl.
| | |
|---|---|
| E05B 73/00 | (2006.01) |
| G06F 1/18 | (2006.01) |
| G06F 21/88 | (2013.01) |

(52) U.S. Cl.
CPC ...... E05B 73/0082 (2013.01); E05B 73/0005 (2013.01); G06F 1/181 (2013.01); G06F 21/88 (2013.01)

(58) Field of Classification Search
CPC .. E05B 73/0082; E05B 73/0005; G06F 1/181; G06F 21/88; G06F 1/1656
See application file for complete search history.

(56) References Cited

U.S. PATENT DOCUMENTS 7,143,614 B1 12/2006 Murray, Jr. et al.
8,408,932 B2 * 4/2013 Villarreal ........... H01R 13/6397
439/358

(Continued)

FOREIGN PATENT DOCUMENTS

CN 107735539 A 2/2018
CN 112096196 A 12/2020

OTHER PUBLICATIONS

International Preliminary Report on Patentability and Written Opinion dated Jul. 11, 2024 in corresponding PCT International Application No. PCT/IB2022/000790.

(Continued)

*Primary Examiner* — Abhishek M Rathod
*Assistant Examiner* — Keon Kim
(74) *Attorney, Agent, or Firm* — OSTROLENK FABER LLP

(57) ABSTRACT

A lock assembly for preventing theft of an electronic mobile device (EMD) is configured to engage a security cavity formed in the 2 mm thick outer wall of the EMD. The security cavity has left and right outwardly-flaring side walls extending away from the opening. The lock body supports first and second locking elements, each of which is configured to be insertable into the security cavity and has an arcuately-shaped side wall that is complementary in shape to the right/left outwardly flaring side wall of the security cavity. The first and second locking elements cooperate structurally to become wedged inside the security cavity in manner that prevents separation of the lock body from the EMD while the first and second locking elements are positioned inside the security cavity. Preferably, the arcuately-shaped sides of the locking elements extend over an arc angle of 180 degrees. A cable is coupled to the lock body to enable tethering the EMD to an immovable object, to prevent its theft.

19 Claims, 18 Drawing Sheets

(56) References Cited

U.S. PATENT DOCUMENTS

| | | |
|---|---|---|
| 9,137,911 B2 | 9/2015 | Avganim |
| 9,549,476 B2 | 1/2017 | Avganim |
| 9,784,019 B2 | 10/2017 | Avganim |
| 11,303,057 B2 | 4/2022 | Avganim |
| 11,808,061 B2 * | 11/2023 | Yang .................. E05B 73/0082 |
| 2003/0106349 A1 | 6/2003 | Broadbridge et al. |
| 2014/0085788 A1 * | 3/2014 | Avganim ................ G06F 21/88 |
| | | 361/679.01 |
| 2015/0271932 A1 | 9/2015 | Avganim |
| 2017/0117667 A1 * | 4/2017 | Su .......................... H01R 24/64 |
| 2017/0222366 A1 * | 8/2017 | Gee ................... H01R 13/6397 |
| 2019/0112840 A1 | 4/2019 | Wu |
| 2019/0226243 A1 | 7/2019 | Lee |
| 2021/0049311 A1 * | 2/2021 | Saito ................... E05B 73/0005 |
| 2021/0234298 A1 | 7/2021 | Avganim |
| 2023/0032573 A1 | 2/2023 | Kao et al. |
| 2023/0139662 A1 * | 5/2023 | Yang .................. E05B 73/0005 |
| | | 70/58 |

OTHER PUBLICATIONS

First Non-Final Office Action with Search Report dated Nov. 8, 2023 in corresponding Taiwanese Patent Application No. 111150505.

* cited by examiner

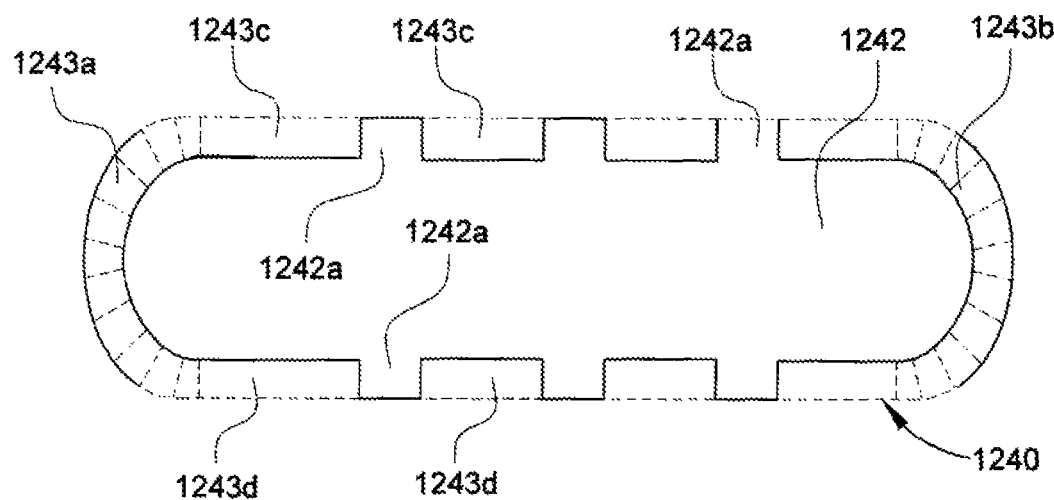
FIG. 12
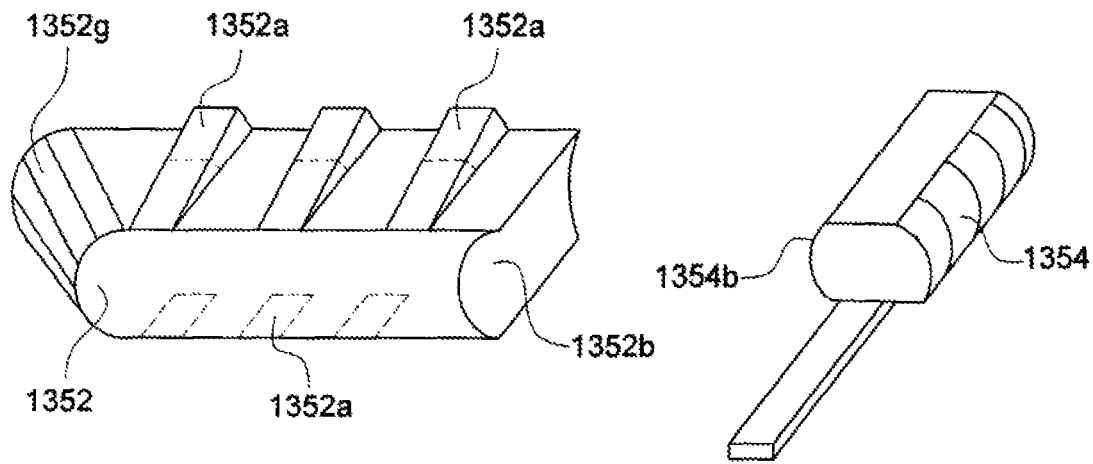
FIG. 13A
FIG. 13B
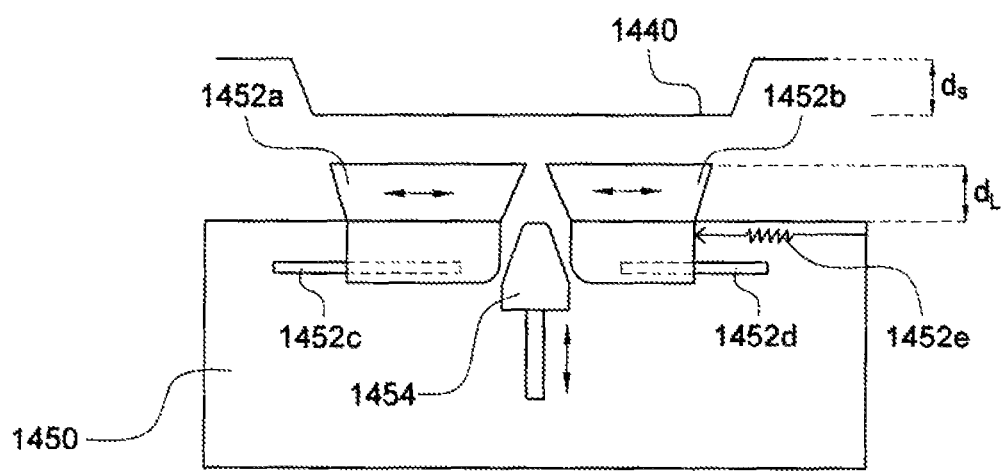
FIG. 14

COMPUTER SECURITY LOCKS AND SYSTEM THEREFOR

CROSS-REFERENCE TO RELATED APPLICATIONS

The present non-provisional patent application claims the benefit of and priority to U.S. Provisional Patent Application Nos. 63/294,408, filed Dec. 29, 2021, by Meir Avganim, and entitled "COMPUTER SECURITY LOCKS AND SYSTEM THEREFOR" and 63/311,415, filed Feb. 17, 2022, by Meir Avganim, and entitled "COMPUTER SECURITY LOCKS AND SYSTEM THEREFOR." The entire contents of each of the patent applications listed above are incorporated herein by reference.

BACKGROUND OF THE INVENTION

The present invention relates to devices and a system for inhibiting the theft of relatively small and mobile, but expensive pieces of equipment such as computers, laptops, telephones and the like. The present disclosure elaborates on the disclosure in the prior filed provisional application of the instant inventor filed under U.S. Ser. No. 63/294,408 on Dec. 29, 2021.

More specifically, the present invention is directed to a theft preventing lock and associated security slot for mobile electronic devices such as computers, tablets and the like, which lock has locking elements that are designed to be received and firmly secured inside a security slot formed in the thin outer wall of the mobile devices in which the thickness of the outer wall is on the order of about 2 millimeters and even thinner. Even more specifically, the present invention is configured to provide the locking function at and/or within the USB-C existing slot of such devices, which slot according to the present disclosure has been modified to have flaring out, i.e., widening (preferably uniformly widening), left and right rounded or curved side walls. The novel slot is referred to herein as the Noble CWedge slot, as this term is indicative of the interiorly rounded/curved side walls of the slot, as more fully explicated later.

Security slots began appearing in computer equipment on a large scale in the early 1990s and a good description thereof is provided in U.S. Pat. No. 7,143,614, the contents of which are incorporated fully by reference herein. Prior art FIGS. 1A 1B, 1C, 1D herein explicate the basic prior art security slots and a type of lock therefor.

In FIG. 1A, a mobile electronic computer or a keyboard 1 (referred to generically as EMD (Electronic Mobile Device) has a security slot 3 into which is inserted a lock 5a (FIG. 1D) which has a cable assembly 14 with a flexible cable 16 and a loop 18. Obviously, the EMD has internal electrical components and circuits (which anyone of the keyboard buttons can be deemed to represent). This type of a lock can be used to attach itself to the computer or keyboard 1 and to be tethered to an immovable object, in well-known manner.

The lock 5a has a locking element 5 which can be inserted through the rectangular, 3×7 mm, security slot 3 that is formed in and through the outer wall 70 of the keyboard, or tablet, or telephone or any small and expensive object 1. The pins 4 prevent rotation of the lock body relative to the security slot 3, and the locking element 5 (essentially a T-bar) is rotated behind the wall 70, bearing against the rear surface 70a of the wall 70.

The prior art rectangular security slot measuring 3×7 mm and having a rotatable T-bar locking element, e.g., element 5, poses issues of complexity, excessive size, insufficient sturdiness and proneness to break internal parts inside the computer 1.

Another drawback of the prior art mechanism is that the T-bar locking element 20 needs to rotate behind the inside surface 70a of the wall 70 of the piece of equipment and, as a result, can cause interference with other internal components. Yet another drawback of the prior art T-bar style locks is that that their overall dimensions make them too bulky to fit into a security slot formed in more recent devices, e.g., in ultrathin laptops that are not more than about 10 millimeters thick. The effect is that the lock, when inserted, lifts the laptop off the surface in which it is resting, which is unacceptable.

The present inventor provided a solution to the drawbacks of the old style T-bar security in early 2012, in the form of a new lock configuration style that ultimately became widely known throughout the world as the Noble Wedge Slot and its associated Noble Wedge Locks. An objective and aim of the present invention is to improve upon the mentioned Wedge lock technology described relative to the present inventor's prior development of the aforementioned security cavity or slot that has been referred to as the "trapezoidal slot" or the Noble Slot, and the locking heads for that slot, as described for example in the present inventor's U.S. Pat. No. 9,549,476 ("the '476 patent) and in his U.S. Pat. No. 9,137,911 ("the '911 patent), the full contents of which are incorporated herein by reference.

For reference purposes and as shown in FIGS. 2A and 2B herein, the prior art Noble slot 7 is "trapezoidal" in shape and formed in a slab of material (metal) 6 that is provided behind the outer wall 70 (FIG. 1D). The slot 7 has a rectangular lock insertion opening 8 and an interior cavity defined by side walls 9a, 9b, a flat ceiling and a floor. A special lock 10 (known worldwide as the Wedge Lock) having the usual cable 11 is provided with locking elements 12 comprising a locking element 12a and a slidable locking element 12b. Initially, the slidable locking element 12b is positioned inside the body of the lock 10, thereby enabling the other locking element to be inserted into the insertion opening 8 and slid to the right, leaving a narrow opening for the subsequent insertion of the slidable locking element 12b. This lock style allows for even a smaller slot insertion opening of approximately 3×4.5 mm, which is important because laptops have become ultrathin leaving very little room for a lock to be inserted into a security slot.

Despite the substantial success of the trapezoidal (Wedge) locks, more recently, many computer makers have opted to forego providing any security slot at all, owing to further dimensional shrinking of tablets and to avoid leaving any openings into the interiors of their devices. The new approach and style of providing barely any plugs, sockets or entry points into mobile devices is also driven by aesthetic considerations.

Responsive to the above mentioned trend of providing no security slot at all, the present inventor has previously addressed that development by providing a new theft preventing concept that provides the locking function via the USB port of such devices, which is always provided even in the most slim and minimalist mobile devices. This is reflected in the present inventor's U.S. Patent Application Publication No. 2021/0234298, (U.S. Pat. No. 11,303,057), the contents of which are incorporated by reference herein.

The present inventor's USB port locking concepts previously presented were based on the idea of providing modified USB plugs that have locking holes in their outer shrouds, which upon insertion of the plug into the USB socket, allows receiving (electrically controllable) locking pins provided inside the electronic devices, effectively locking the USB plug inside the USB socket. Most importantly, the cable extending from the plug is steel-reinforced and includes the aforementioned locking "loop." Thereby, the USB plug is rendered into a theft preventing device. It is worth noting that the above solution can be implemented in dual forms, one in which it is constructed to provide solely the theft preventing function and another in which it provides the dual functions of carrying electrical signals and the anti-theft function.

Still, the quest to provide anti-theft protection has been hampered by the fact that many computer makers have opted not to cooperate. They are not interested in modifying the internal structures of their USB ports to accommodate locking components and/or associated electronic controls. It is in response to the foregoing that the present inventor has conceived of the revolutionary and counter-intuitive theft preventing concepts and implementations that are the subject of the present disclosure, as described below.

Thus, in the known theft preventing locking concepts the "locking elements" are several millimeters long, typically at least 5 millimeters, meaning that the locking elements penetrate inside the equipment being protected to a depth of at least 5 mm. In the case of the T-bar lock style, the locking elements must penetrate beyond the outer wall and turn and engage the inside surface of the outer wall to attain structural strength. Similarly, the locking elements for the trapezoidal slot must also reach beyond the outer wall and deep into the trapezoidal slot 7 formed in the slab 6 (FIG. 2A).

In departure from the prior art, in preferred embodiments described below, the locking elements do not penetrate beyond the thickness of the outer wall, which is on the order of about 2 millimeters, or in the range of 1.5 to 2.5 millimeters. The prevailing view in the art has been that a wall thickness of 2 millimeters, even if made of hard metal such as aluminum, steel or light magnesium alloys is insufficient to provide the needed strength for the needed locking function, where a common requirement is for the lock being able to withstand pulling and side to side pulling tests exceeding 150 pounds of force.

The disclosure below provides solutions to what was deemed heretofore impossible or at least impractical to achieve and is able to provide the locking function with only minimal modification to the shape of and the manner in which the USB slot is fabricated and positioned relative to and/or in the outer wall of the electronic devices.

SUMMARY OF THE INVENTION

It is an object of the present invention to provide electronic equipment security locks and security slots that avoid at least some of the disadvantages of the prior art.

Another object of the present invention is to provide a USB opening that permits and enables locking elements to grasp the outer wall within the wall thickness and without permitting any locking elements to penetrate beyond the rear surface of the outer wall.

The foregoing and other objects are realized with a locking mechanism that can grasp inclined features inside the outer wall thickness of the EMD, without penetrating inside the interior of the EMD.

The present disclosure refers to arcuately-shaped inclined surface within the thickness dimension of the outer wall of the EMD that provide a grasping surface for locking elements that can physically connect a lock body to the EMD with a force meeting a pulling test of at least 150 pounds.

The present disclosure refers to and describes many preferred embodiments of the present invention including the following. An electronic mobile device (EMD) including a security facility that enables the EMD to be tethered to an immobile object to prevent theft of the EMD, the EMD comprising: a housing defining an interior that holds electrical components and circuits of the EMD, said housing being partially defined by an outer wall that is made of metal and has a wall thickness of less than 2.3 mm, an outside surface and an inside surface of said outer wall both extending parallel to a flat plane associated with the outer wall; an electrical port comprising a generally rectangular port slot formed in the outer wall and an electrical connector located inside the housing juxtaposed to the port slot, the port slot being defined by an elongate upper wall edge, an elongate lower wall edge, a left side, arcuate wall edge and a right side, arcuate wall edge, the four edges defining a security port slot configured to receive locking elements of a lock assembly; wherein the upper and lower wall edges extend perpendicularly to the plane of the outer wall and the left and right side arcuate edges flair away from the outer surface of the outer wall and extend at angles in the range of 45 to 75 degrees relative to the plane of the outer wall, away from an ingress into the security port slot, and each arcuate edge extending between the lower and upper edges of the outer wall over an arc angle in the range of 120 to 180 degrees, each of the arcuate edges being defined by a respective interior surface shape; and wherein the arcuate edges are formed so that a pair of said locking elements associated with a lock body that have outer surfaces that complementarily match the surface shapes of the arcuate edges are capable of being inserted into the port slot and hold onto the outer wall when being pulled out by a force greater than 100 pounds.

In preferred embodiments, the arc angle extension of each of the arcuate edges is between 160 to 180 degrees, preferably 180 degrees. The electrical connecter has a shroud that surrounds a PCB (printed circuit board) and the arcuate edges of the port are laterally spaced away from the shroud. The wall thickness of the outer wall is in a range from 1.9 to 2.25 mm. At least one of the locking elements is slidable within the security port slot to engage tightly one of said arcuate edges. The arcuate edges are sufficiently sturdy as to retain the locking elements in the security port slot, without the locking elements protruding beyond the inside surface of the outer wall. The respective surface shapes of the arcuate edges are mirror images of each other.

In other embodiments, at least one slit in each of the upper and lower edges is included, so configured as to allow protrusions associated with the lock assembly to pass through the slits and then be inserted into the upper and lower edges to improve the holding power of the security port slot on the lock assembly. Preferably, at least two of said slits in each of said upper and lower edges of said security port slot are included. The lower edge of the security slot/cavity is located at a height above a bottom surface of said EMD that is less than 2.5 mm. The metal of the outer wall is one of aircraft grade aluminum, magnesium, titanium, tungsten, chromium and a steel alloys that score very high on the Mohs and Vickers Scales.

In other embodiments, the locking elements comprise first and second locking elements that are insertable serially one after the other into said security port slot. Or, the locking elements comprise first and second locking elements that are insertable together into the security port slot and including a third locking element located between the first and second locking elements.

In an embodiment, the EMD includes: a housing defining an interior that holds electrical components and circuits of the EMD, said housing being partially defined by an outer wall that is made of metal and has a wall thickness of less than 2.3 mm, an outside surface and an inside surface of said outer wall both extending parallel to a flat plane associated with the outer wall; a security slot formed inside said outer wall, said security slot comprising first and second slits that are parallel to each other and extend obliquely into the thickness of the outer wall and a third slit that extends between and connects the first and second slits at a deeper end thereof, the first, second and third slits being configured to receive a locking element of a lock that is locatable on the outer surface of the outer wall and then slidable between the first and second slits and then into the third slit, and a locking hole formed in the outer wall adjacent the slits and configured to receive a locking pin insertable into it from the lock to prevent the lock element from being withdrawn in a locked state of the lock. Preferably, also included is an access opening to reach an electrical connector inside the EMD, and wherein the security slot is formed around said access opening.

Other features and advantages of the present invention will become apparent from the following description of the invention which refers to the accompanying drawings.

BRIEF DESCRIPTION OF THE DRAWINGS

FIG. 12 illustrate a modified CWedge Slot that provides additional, locking element grasping surfaces, away from the side edges of the slot.

FIGS. 13A and 13B illustrate locking elements for the security slot of FIG. 12.

FIG. 14 (diagrammatically) illustrate another embodiment of a lock for the security slot of FIG. 11, with at least two slidable (or pivotable) main locking elements and a third locking element that actuates the two main locking elements.

DETAILED DESCRIPTION OF PREFERRED EMBODIMENTS OF THE INVENTION

Figure 3:
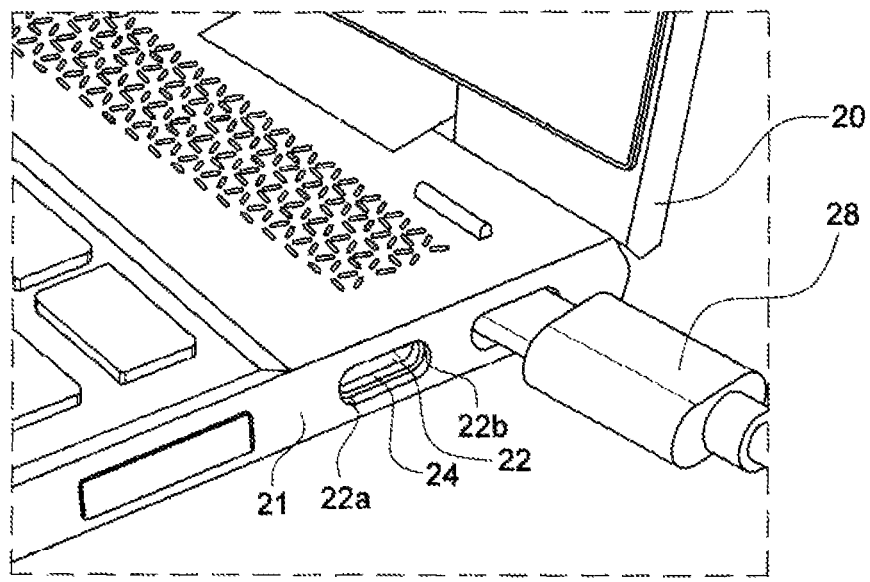
FIGS. 3 and 3A through 3D depict conventional USB-C slots or ports.
Figure 3A:
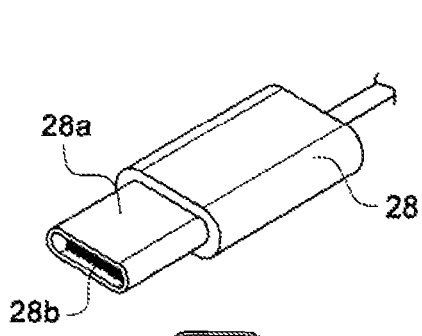
Figure 3B:
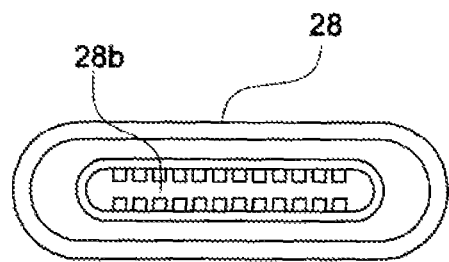
Figure 3C:
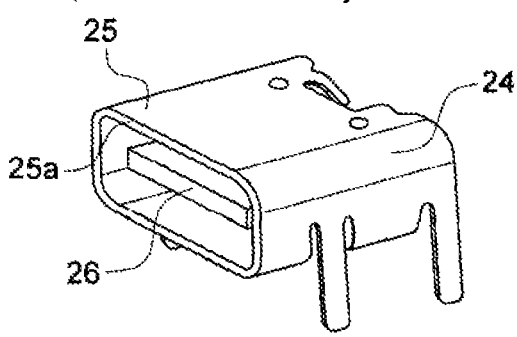
Figure 3D:
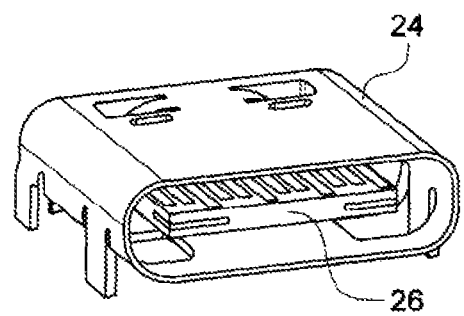

Since the present invention is directed to a security slot fashioned from a conventional opening of standard USB connection ports, preferably a USB-C port, initial reference is made to prior art FIGS. 3 and 3A through 3D, for a basic understanding of the structures of such ports. FIG. 3 shows an outer side wall 21 of a laptop 20 having a USB port 22 that is generally rectangular with rounded side wall edges 22a and 22b. Beyond the opening 22 is mounted a USB socket 24 holding within electrodes mounted on a PCB 26. The socket 24 is sized to fittingly receive the male plug 28a of a USB cable 28, as known. The interior 28b of the plug 28a just fits over the PCB electrodes inside the socket 24, effecting electrical connections of 24 signal lines (in the case of the USB-C format). FIGS. 3A and 3B show the male USB-C plug 28. The socket 24 is mounted behind and inside of the opening 22 formed on the outer wall 21 of the electronic device 20.

The foregoing description of the conventional USB-C socket provides the basis for explicating the concepts of the present invention. Initially, it is noted again that the depth of the opening 22 facing and located in front of the socket 24 is dictated by the "thickness" of the outer wall 21. Also, as noted above, this thickness is about 2 millimeters (for the purposes herein that thickness is in the range from 1.75 to 2.5 millimeters), virtually providing no structural integrity or strength inside the opening 22 to allow the locking elements of a conventional locking head to grasp onto and hold to the outer wall 21 with sufficient force, which is typically required to meet a pulling force of at least about 150 pounds of force. Yet, despite the improbability of being able to do, the present inventor describes below a locking method and structure that provides a holding power on an order of at least 100 pounds of a pulling force and, indeed, well beyond 100 pounds.

Fundamentally, the present disclosure relies on the idea that the outer walls in many devices are now constructed of much stronger materials and fabricated to very high and exacting tolerances using for example CNC (Computer Numeric Control) machining techniques. The outer shells of many computing devices are made of the hardest metals such as of aircraft grade aluminum, magnesium, titanium, tungsten and/or chromium or even of steel alloys that score very high on the Mohs and Vickers Scales. These metals are very hard, do not easily deform, resist wear and maintain their design structural shapes over many years of use.

Figure 1A:
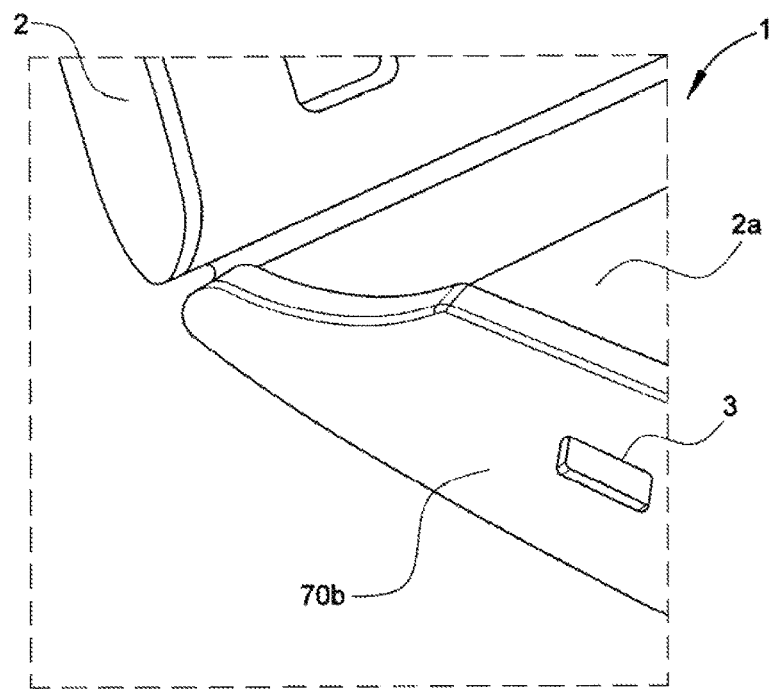
FIGS. 1A through 1D depict lock concepts that use the conventional, through-going 3×7 mm security slot, universally known as the Kensington Slot.
Figure 1B:
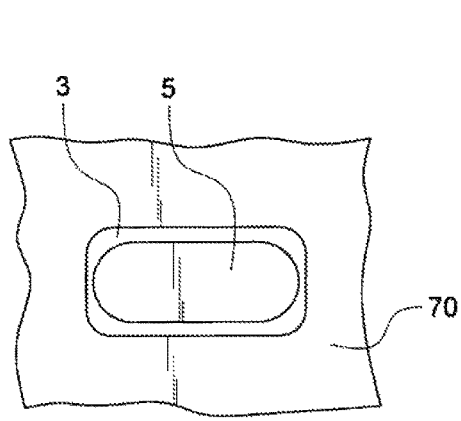
Figure 1C:
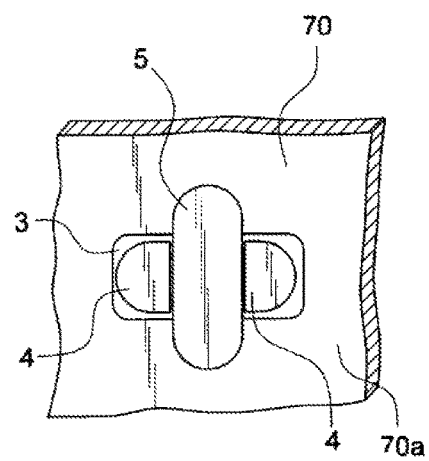
Figure 1D:
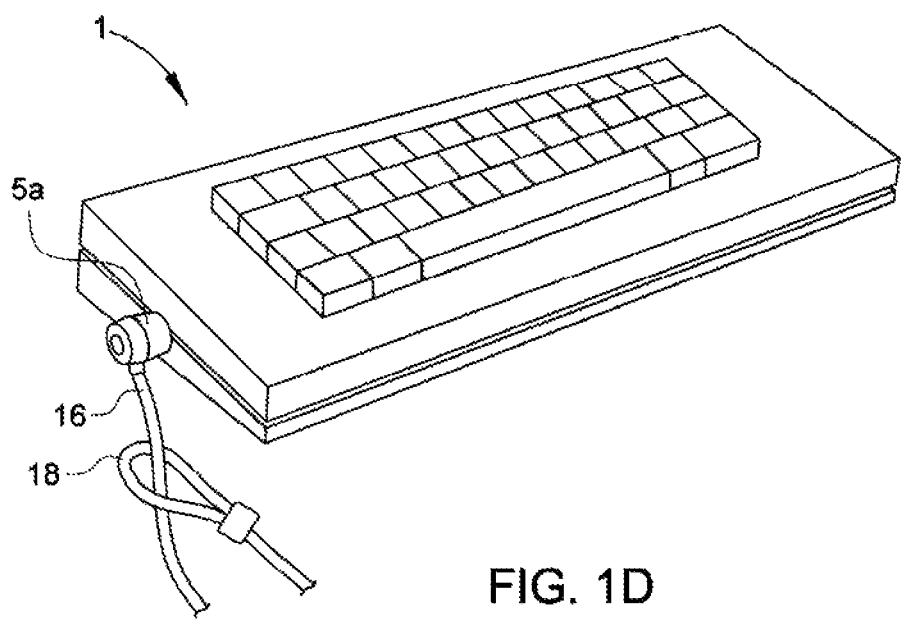
Figure 2A:
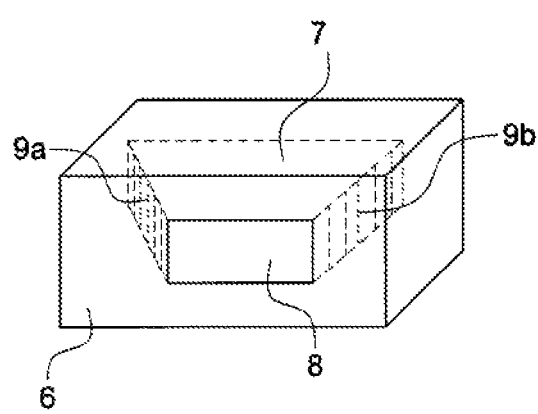
FIGS. 2A and 2B depict the present inventor's conventional, trapezoidal (Wedge) slot and the Wedge Lock therefor.
Figure 2B:
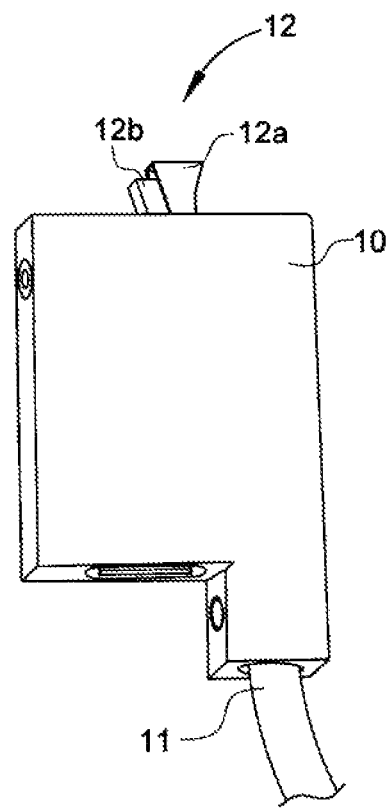
Figure 4A:
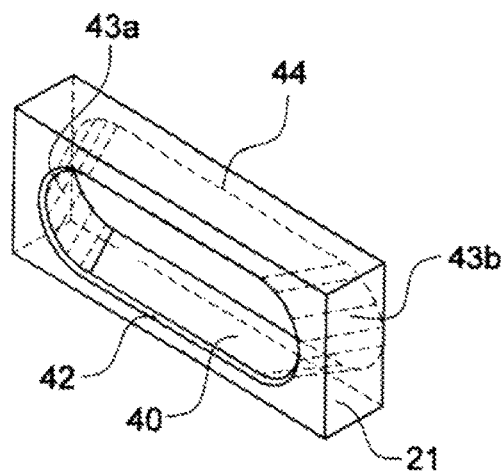
FIGS. 4A and 4B diagrammatically illustrate the "in-the-outer-all" locking slot according to an aspect of the present invention, which security slot is referred to herein as the Noble CWedge Slot (to denote the use of "wedging" locking elements in a tight slot with the added feature that the sides of the slot are curved for attaining increased holding power inside the slot).
Figure 4B:
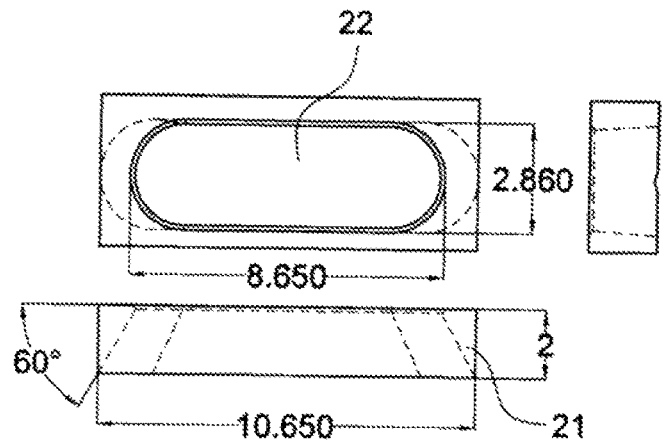

Accordingly, the present invention very carefully and precisely shapes the interior, only about 2 to 2.25 (+/−.25) millimeter thick, outer side wall 21 (FIG. 3) defining the opening 22 so that, as shown in FIGS. 4A and 4B, their side walls edges flare out dimensionally from the ingress 42 of the opening 40 to its egress 44, as shown in FIG. 4A. This side wall widening occurs only over the miniscule, 2 to 2.25 (+/−) mm thickness dimension of the wall 21. While this appears to be similar to the walls 9a, 9b in FIG. 2A, this is deceiving because the prior art trapezoid slot is formed in a slab that 2 or 3 times as thick, typically at least 5 mm thick and the side walls onto which the locking elements are anchored are flat surfaces. See in FIG. 2A the side surfaces 9a, 9b.

Figure 4C:
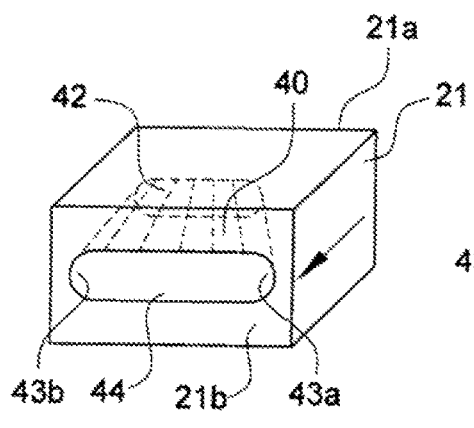
FIGS. 4C, 4D and 4E elaborate the explication of the CWedge Slot.
Figure 11:
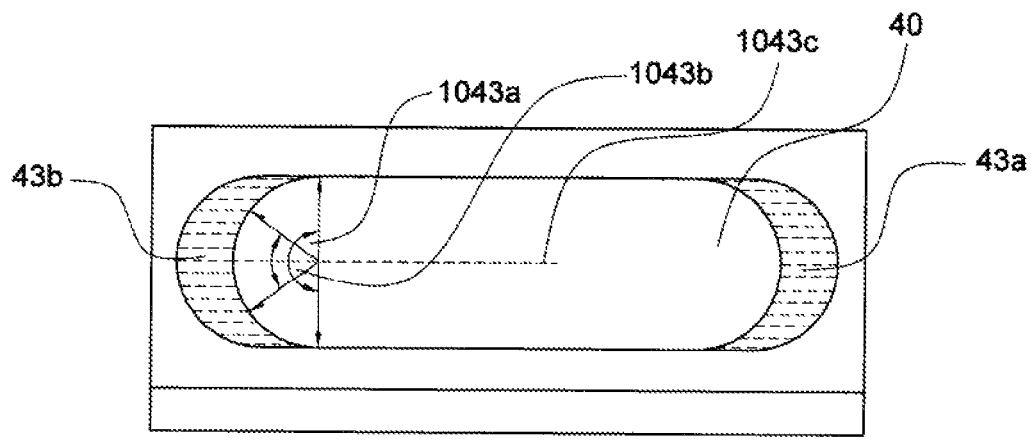
FIG. 11 is another illustration of the CWedge Slot, as seen from inside the mobile device, illustrating the arc-angle possible dimensions for the CWedge Slot.

In marked contrast, the side walls 43a, 43b according to the invention herein flare out arcuately over an arc angle of about 180 degrees, as more clearly shown in FIG. 11, although the range can be from about 120 to 180 degrees. This causes the forces that resist pulling out of the below described locking elements from the cavity 40 to be directed in numerous directions that span 180 degrees all along the side walls 43a and 43b, not just sideways to the right and left of the slot as in the prior art trapezoid/wedge slots. This prevents the complementarily shaped locking elements (described below) from being pulled out even though they are acting over only a surface that measures about 2 millimeters or so in thickness. Note that in FIG. 4C, the ingress into the locking slot is from the direction of the arrow at the top of the figure. While the arc angle of the curved side walls is shown in the drawings to be about 180 degrees, the invention provides useful results over arc angles in the range of from about 120 to 180 degrees. That is, while with 180 degrees the locking element is lockingly engaged sidewise and well as from above and below, the locking effect can be achieved even at lower arc-angles of curvature (although with lesser holding power).

Figure 4D:
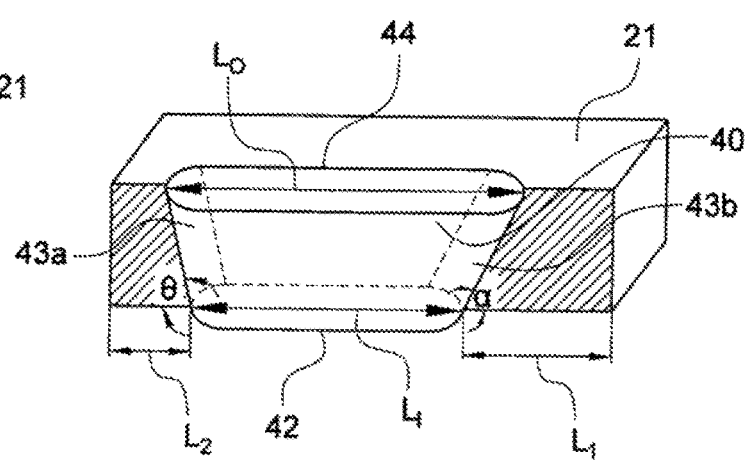

FIG. 4D indicates the angle of inclination of the side walls indicated by the symbols O and 22 at the left and right. Ideally, they should be identical. Also, that angle should not be lower than about 45 degrees and preferably closer to and about 60 degrees, to optimize the holding power on the locking elements and the resistance against deforming the slot shape. In the FIG. 4D the ingress into the opening 40 is drawn at the top.

Figure 4E:
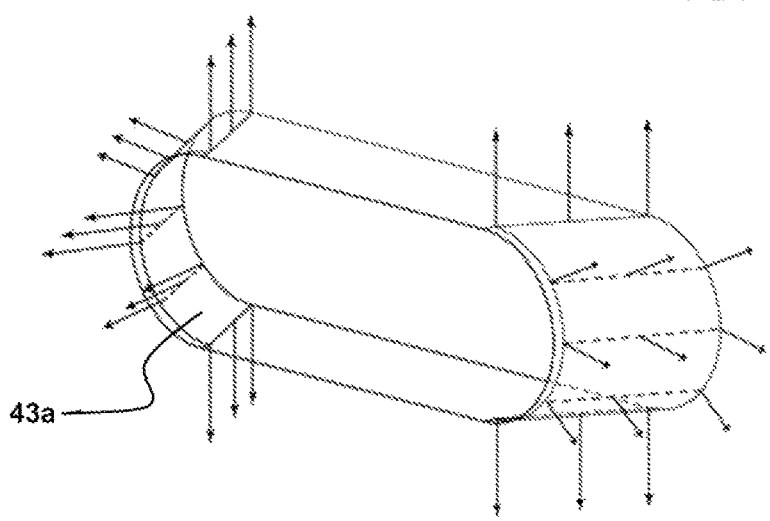

The slot's or cavity's geometry is a leap jump over the prior art trapezoidal security slot referred to above in several respects. As shown in FIG. 4E, the force bearing surface is constantly curving, over an arc angle of 180 degrees in the plane of the paper. More importantly, the force vector direction constantly changes all along the section 43a (and the same at the section 43b on the other side), which is indicated by the arrows drawn outside around the section 43a. This indicate that the forces that resist the pulling out of the locking elements (described below) constantly change direction, both in going circularly around the section and when proceeding from the ingress to the egress of the cavity 40. Thereby, the "forces" that resist a pulling out of the locking elements, is distributed and directed in all direction inside the material that forms the outer wall 21. Secondly, the shape of the section 43a is considerably larger than the side walls in the trapezoidal slot. Thus, if the "height" (indicated by "h" in FIG. 4D) is about equal to the "diameter" that of the curvature of the curved side wall (43a, for example), and since the circumference of a circle is equal to "Pi" (Π) times D (diameter), the surface area of the curved section 43a calculates to provide about 60% more surface area than would be available with the conventional Wedge slot (for the same slot depth). The actual area enlargement is even greater because the deeper into the cavity 40 one proceeds, the larger is the internal circumference, providing a greater holding area. Hence, even though in the present invention the depth of the slot is less than one half that of the conventional Wedge Slot, it provides nearly the same and even greater holding power. Thereby, without reaching beyond the slot to grab or hold onto the rear surface of the outer wall 21, the invention provides the needed holding power that prevents would be thieves from pulling out the locking elements from the opening 40.

Figure 5:
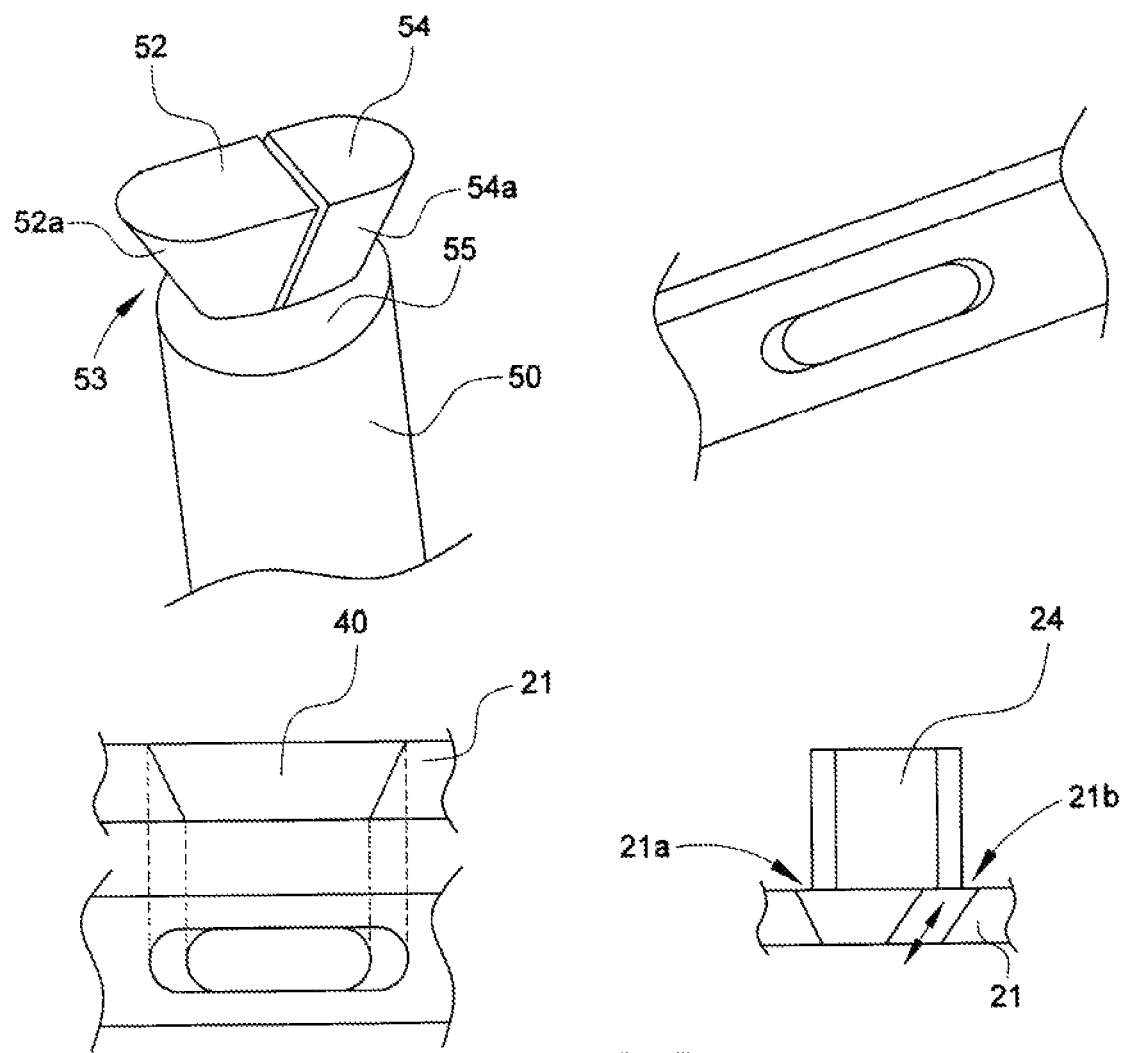
FIG. 5 shows (diagrammatically) locking elements for engaging and holding on tightly to interior features of the CWedge Slot or cavity, without penetrating beyond the slot and without engaging the rear inside surface of the outer wall of the laptop (as do the T-bar style locks).

Referring now to FIG. 5, the lock body 50 having has a front surface 55 from which protrude the locking elements 53 including the main locking element 52 and a sliding locking element 54, each locking element having its respective arcuate side wall 52a and 54a. With the locking element 54 initially located inside the body 50, the main locking element 52, whose lateral size is just under the size of the ingress opening 42 is inserted into the cavity 40 and moved sideways to bear against the arcuate sidewall 43a (or 43b) of the cavity 40. This leaves a space at the ingress side for the subsequent insertion of the movable locking element 54. Note that the lengthwise extension of the locking elements is astonishingly small, just about 2 mm or so (to assure that they will not contact the USB socket 24). The fit within must be precise with literally no give at all to prevent the locking elements 52, 54 from sliding within, let along sliding out of the locking slot 40. As also indicated, preferably the left and right edges of the socket 24 are shaved off just a bit to minimize the possibility of touching the socket 24.

Figure 7:
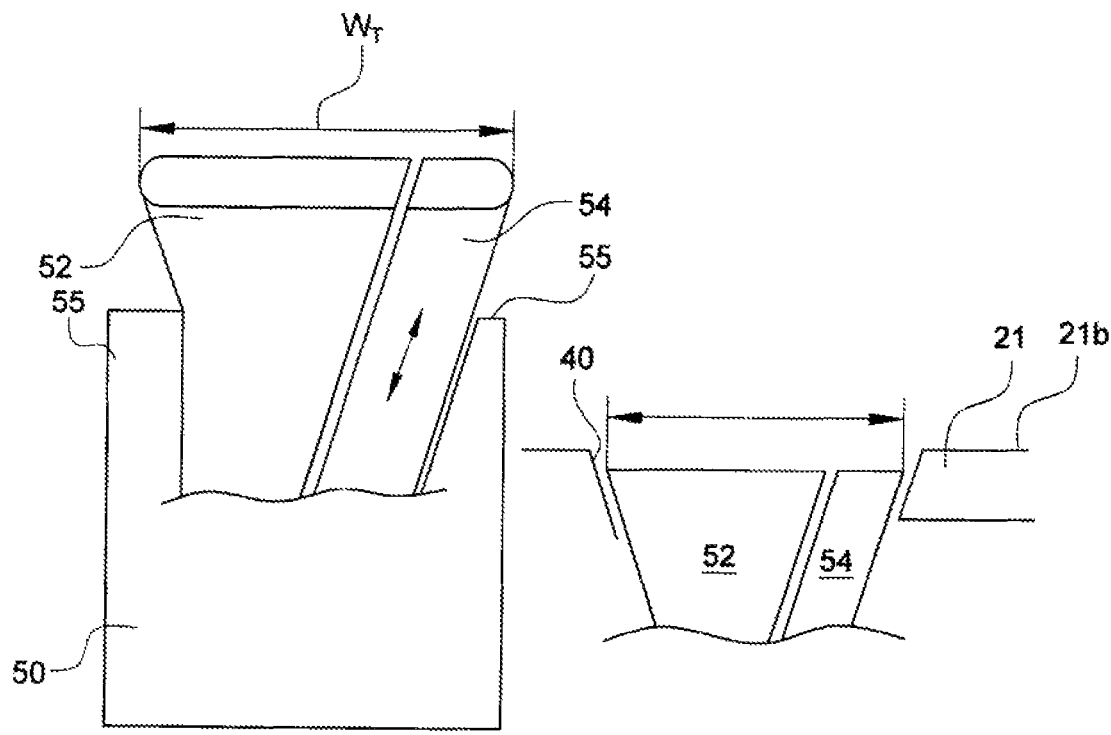
FIG. 7 is a diagram that depicts a locking principle applicable to the lock of FIG. 6.

The needed, virtually perfect fit between the locking elements 52, 54 and the slot 40 is demonstrated in FIG. 7. Shown at the left are the locking elements 52, 54 outside the slot/cavity 40 and at the right inside the slot 40 formed in the wall 21. Even a small under sizing of the locking elements will cause them to slide down in the slot 40, leaving the contact depth at say only 75% (1.5 mm), which will reduce the lock's holding power by 25%. This may be insufficient to hold onto the side walls and also would allow side to side bending of the lock 50, and thereby enable a would-be thief to extricate the locking elements 52, 54 out of the cavity 40, through forces applied even by hand.

Figure 6:
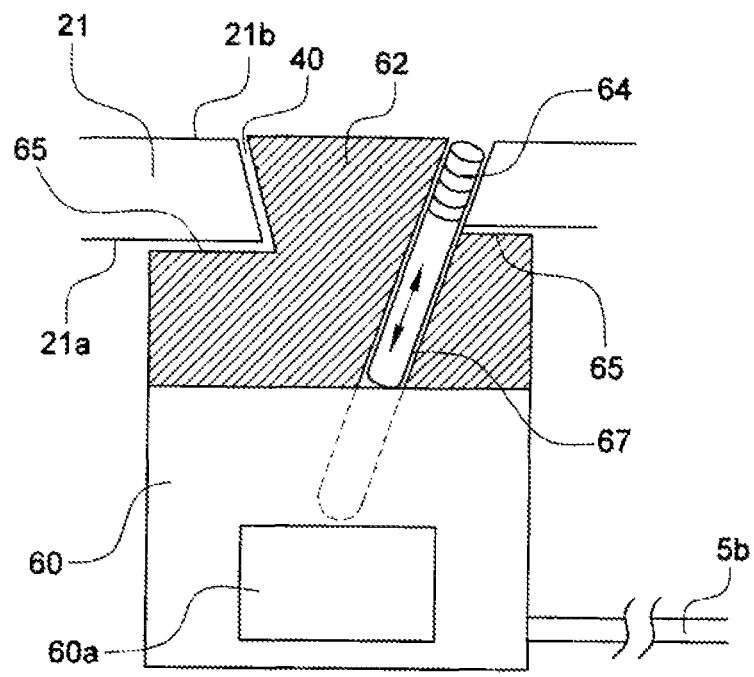
FIG. 6 depicts (diagrammatically) further aspects of CWedge locks of the present disclosure.

In the embodiment of FIG. 6, the lock 60 supports the main locking element 62 which extends from a slab 61 and which is wide enough to extend and cover the entire slot ingress 42. Inside the slab 62 is defined a sliding channel 67 for the sliding locking element 64. The shape of the locking element 64 can be the same as that of the locking element 54, or it can have a round cross section and be movable by being threaded inside the channel 67 which may then include interior threads, enabling the locking pin 64 to be turned by a lock mechanism 60a in one or the opposite directions to enter or exit the 2 mm deep slot 40. Optimally, the upper surface 65 of the lock 60 tightly abuts the front surface 21a of the wall 21, thereby not allowing side to side tilting of the lock 60. The curvature of the pin 64 might be made to match that of the slot sidewalls 43a. Ideally, the pin 64 should have a constant cross sectional size throughout, but it is also possible to have that size increasing very slightly across the leading 2 mm of the pin 24, so the deeper it penetrates into the slot/cavity the more forceful is the contact with the side walls 43a, 43b of the slot 40. The cable 5b is attached to the lock 60 and serves the same function as in the prior art.

Figure 8:
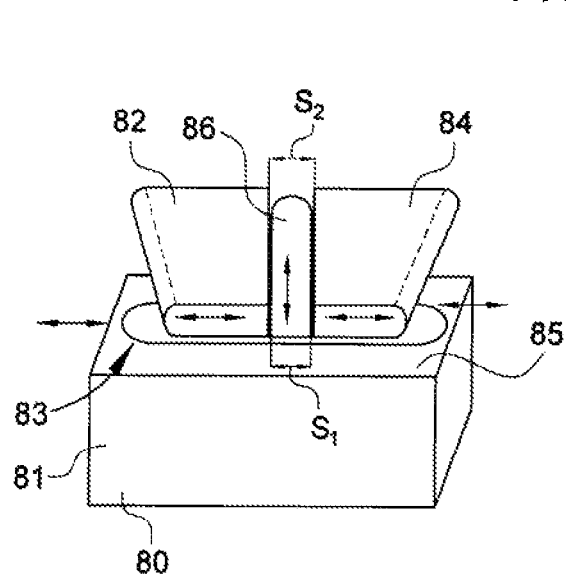
FIG. 8 depicts another embodiment for locking elements for the CWedge Slot.

For added assurance that strong contact is obtained with the slot sidewalls 43a, 43b over the entire slot depth, the embodiment of FIG. 8 provides a lock 80 with a body 81 and three locking elements 82, 84 and 86. The main locking elements 82 and 84 are moveably anchored/coupled in the body 81 (and being biased toward each other by a spring or a magnet) so they can be moved respectively to the left and right and tightly against the slot sidewalls 43a, 43b by the vertically moveable pin 86. This locking pin 86 has a leading end just slightly narrower and its body gradually increases in thickness. The locking mechanism 60a typically provided, forcefully pushes the pin 86 between the locking elements 82, 84, spreading them apart and assuring a tight contact with the side, upper and bottom surfaces, with sold contact between the surface 65 and the front slot wall 21a.

Figure 9:
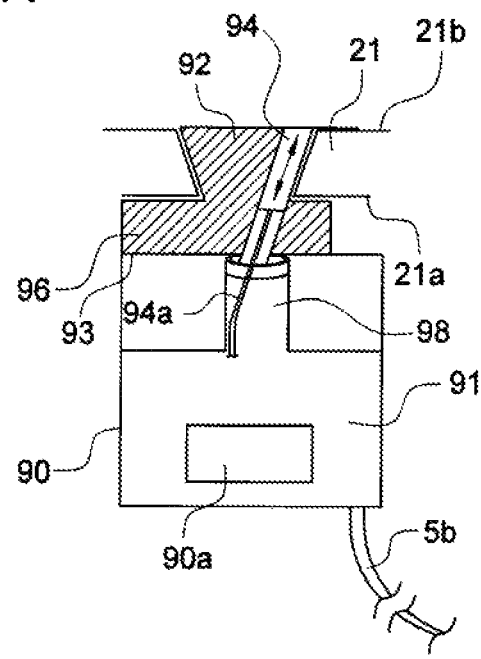
FIG. 9 depicts yet another embodiment for locking elements for the CWedge Slot.

As an added protection against attempts to loosen the hold of the locking elements on the slot side walls, the embodiment of FIG. 9 provides a tubular neck 98 between the locking elements 92, 94 and the slab 96 and the main lock body 91 of the lock 90. Thereby, grasping and yanking the lock body 91 in any and all directions will bend and deform at only the neck 98 but not at the locking elements. In this embodiment, moving the locking element 94 in and out is enabled by a flexible steel wire 94a that connects the locking element 94 to the lock mechanism 90a.

Figure 7A:
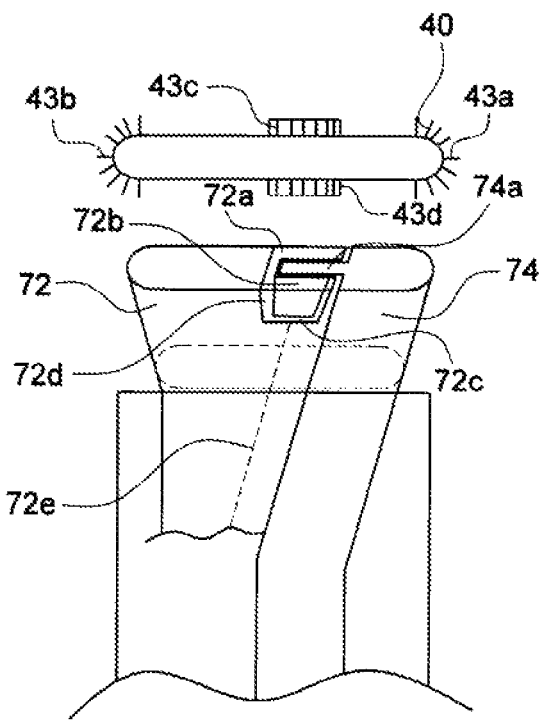
FIG. 7A shows a further development of the locking elements of FIG. 7, with an ability to engage the CWedge Slot at a center region thereof.

The embodiment of FIG. 7A builds on the FIG. 7 embodiment to add strength to the holding power of the locking elements to the slot 40. In FIG. 7A, the moveable or sliding, locking element 74 includes a tongue 74a that rides inside a groove 72e formed in the main locking element 72, providing a more integrated combined locking member. Moreover, the slot 40 in this embodiment is defined by additional "flaring out" surfaces at the top and bottom of slot 40, at the locations indicated by numerals 43c and 43d. Commensurate therewith, the main locking element is formed with two tabs 72a, 72b that are separated from the main body of the locking member 72 at the gap 72d and are flexible enough to spread apart when the tongue 74a of the sliding locking member 74 moves therebetween. This enables the locking members to hold onto the slot 40 not only at the flaring-out, side walls 43a and 43b, but also at 43c and 43d, holding the locking members from the two sides as well as from above and below.

Figure 5A:
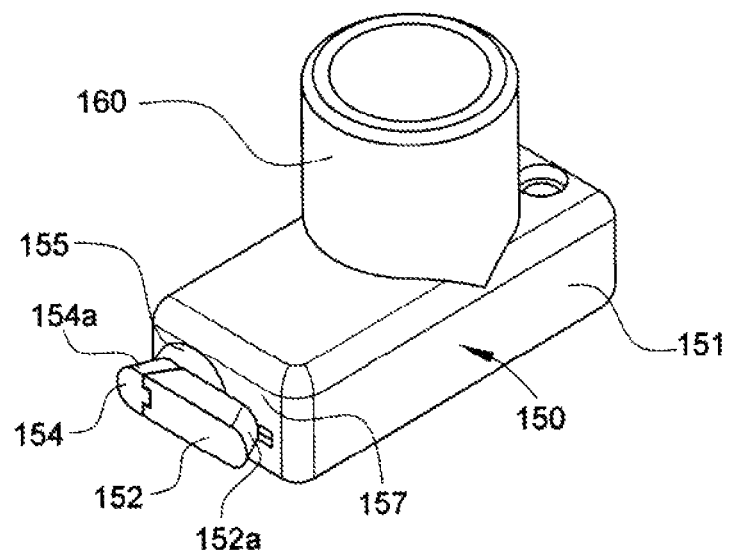
FIGS. 5A through 5H show actual, reduced to practice locks that have shown the ability to tightly hold within the super-shallow RoundWedge Slot, withstanding pulling tests of hundreds of pounds of force (these locks being referred to herein as the Noble CWedge Locks, which is indicative of their dual ability to both lock the portable device and block access to its USB port thereby preventing data theft).
Figure 5B:
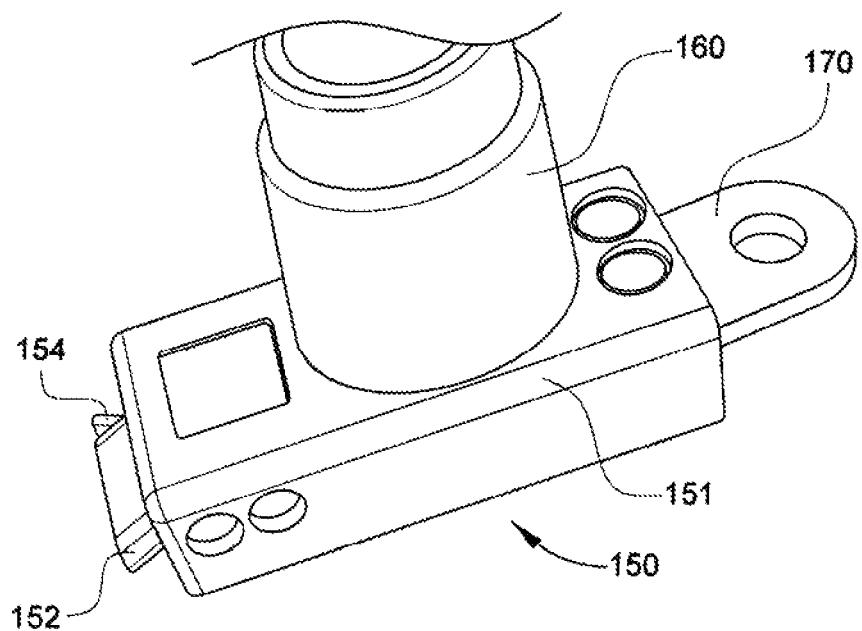

Reference is now drawn to the FIGS. 5A through 5H that show a lock that has actually been reduced to practice and tested to demonstrate that it produces the needed locking functionality in actual mobile devices. As shown in FIGS. 5A and 5B, the CWedge Lock 150 has a main body 151 that supports a key-operated lock cylinder 160, a cable tab 170 at the rear (to which is affixed the conventional cable, shown elsewhere) and which defines a front body-surface 157. Most importantly, the main locking element 152 protrudes from the front surface 155, while the movable locking element 154 is supported inside the body 151 in a manner that enables it to slide, in and out of the body 151 to rest against and alongside the main locking element 152. The extension of the locking elements out of the body 151 matches, nearly exactly, the depth of the slot 40, assuring close contact and abutting of the front surface 157 against the front surface of the of the outer wall 21 of the mobile device 1 being protected against theft. The tight fit guards against prying tools being inserted between the lock 150 and the device 1 and also reduces the ability to apply left/right or up/down bending forces being applied by a would be thief to separate the lock from the device.

To insert the lock 150 into the CWedge Slot 40, the lock cylinder is operated to retrieve the locking element 154 inside the body 151. This enables the main locking element 152 to be inserted into the slot 40 and pushed sideways to engage one or the other of the curved side wall surfaces 43a, 43b. In that position, the key (shown later) operates the lock cylinder 160 to cause the other locking element 154 to slide out and into the security slot 40, completing the affixing of the lock to the device. See FIGS. 5F and 5G that show the key 165 being used to control the locking element 154. While the invention has been described relative to a key-operated lock, naturally it could be implemented using combination operated locks, or electronically operated or any known locking mechanism that functions to prevent retrieving the movable locking element from the slot.

Figure 5C:
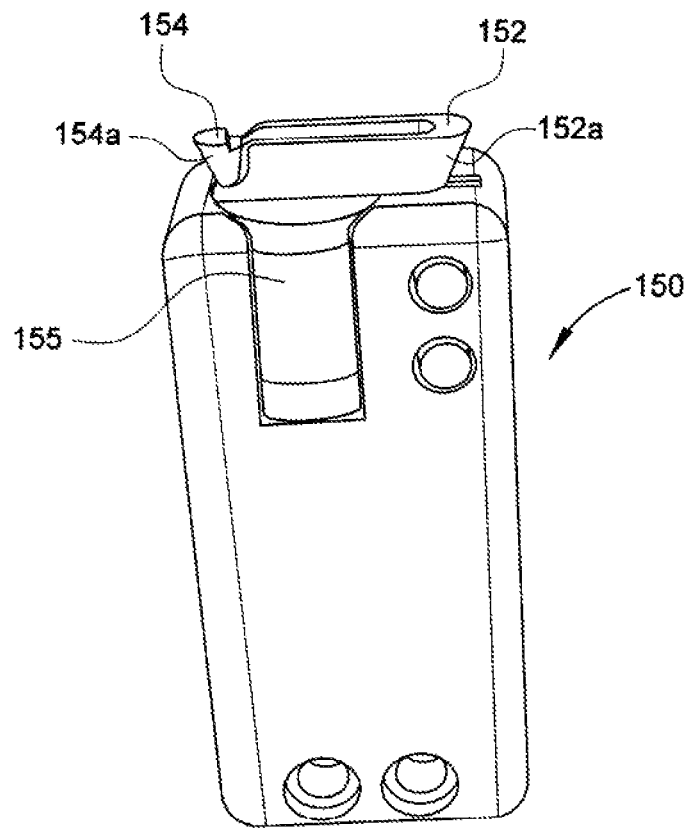
Figure 5D:
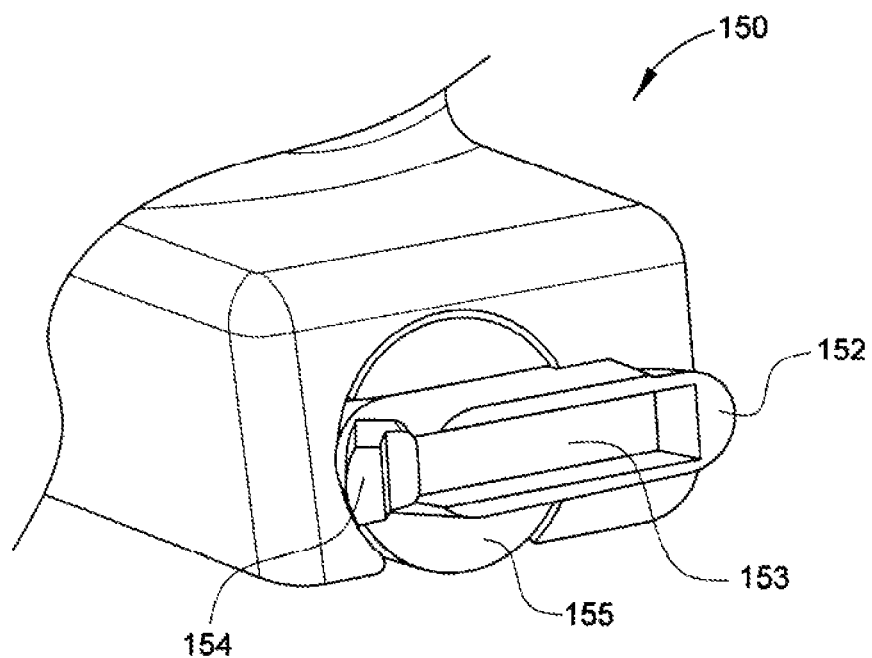
Figure 5E:
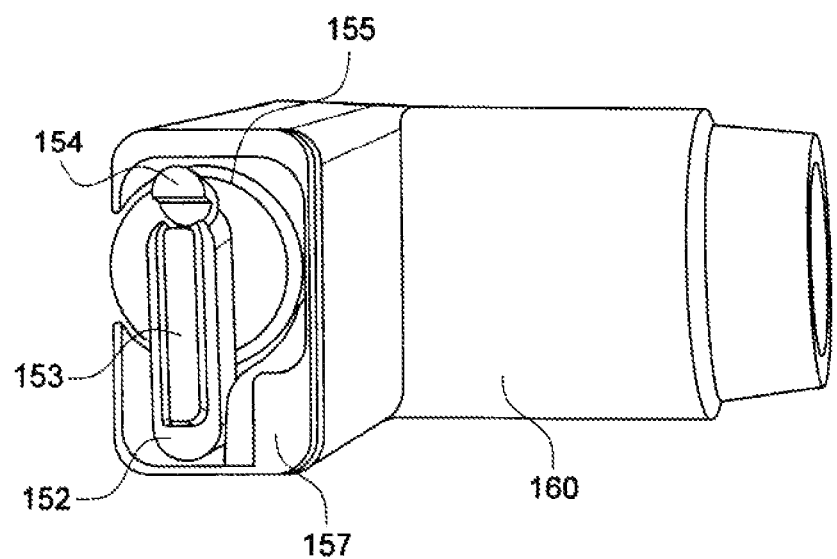
Figure 5F:
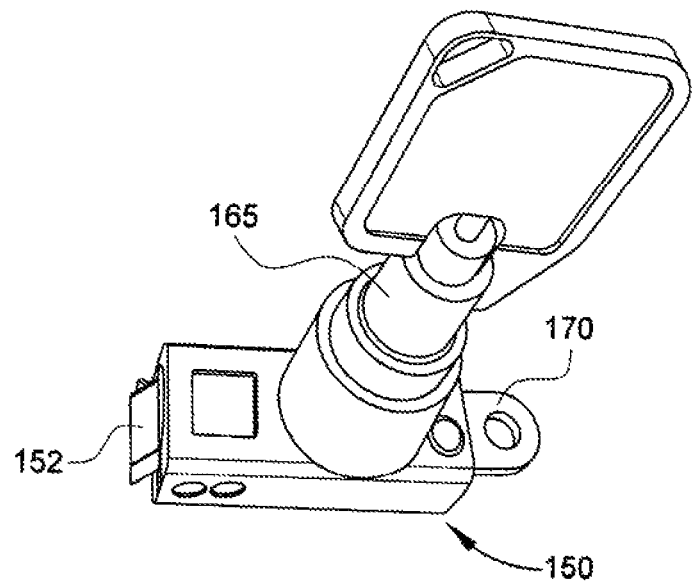
Figure 5G:
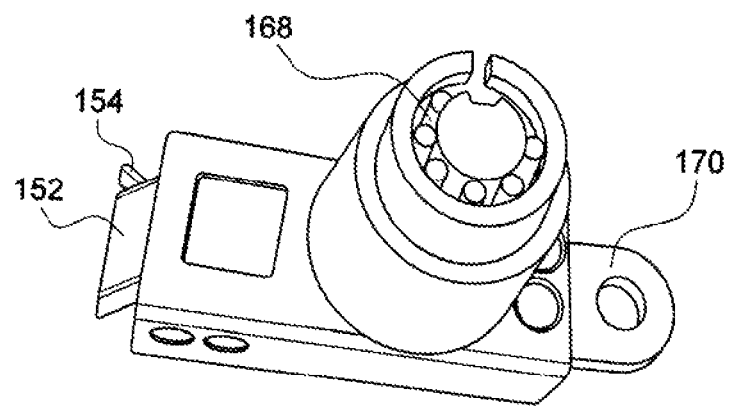
Figure 5H:
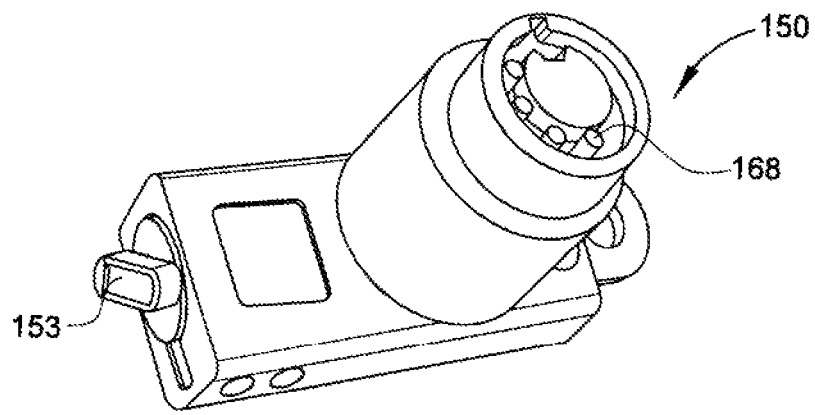

Turning to FIGS. 5C through 5H, note in FIG. 5C the rotatable structural coupler 155 that couples the locking elements 152, 154 to the body 151, so that they can rotate relative to the body 151, assuring against trying to rotate the body 151 (by hand or using plyers) to break the body 151 from the locking elements 152, 154. In FIG. 5D, the locking element 152 is shown to include a clearance groove 153, which assures that when that locking element is inside the slot 40 it will not contact or damage the electrodes PCB 26 of the USB-C socket 24 (see FIG. 3D), which might protrude into the slot 40. The "rotate-ability" of the locking elements 152, 154 relative to the lock body 151 is illustrated in FIG. 5H.

Figure 10A:
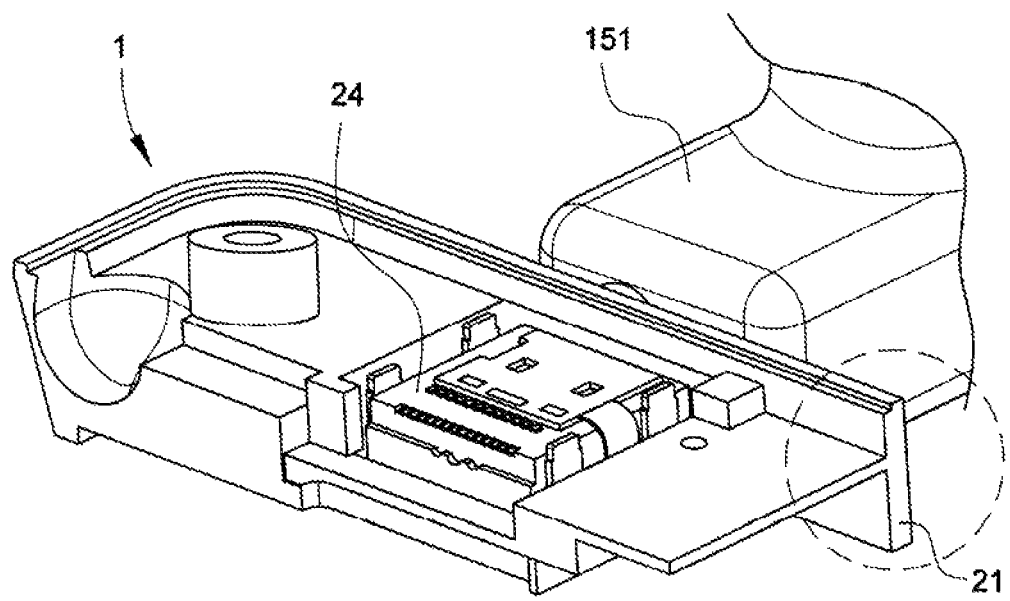
FIG. 10A shows a portion of a mobile device with the top wall removed showing the location of the USB-C socket relative to the access opening thereto in the outer wall of the EBD.
Figure 10B:
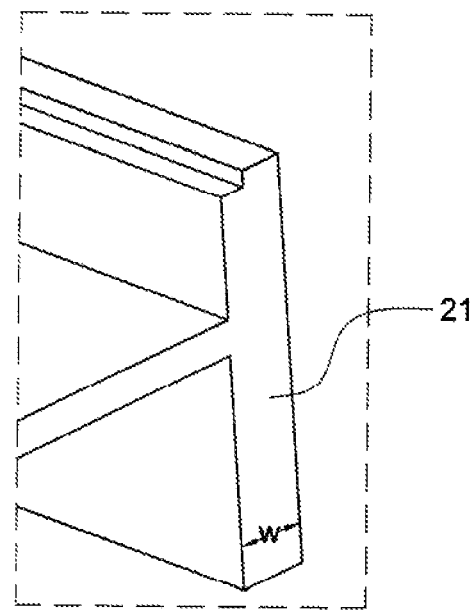
FIG. 10B is an enlargement of a section of the outer wall in which the present invention provides its CWedge Slot.
Figure 10C:
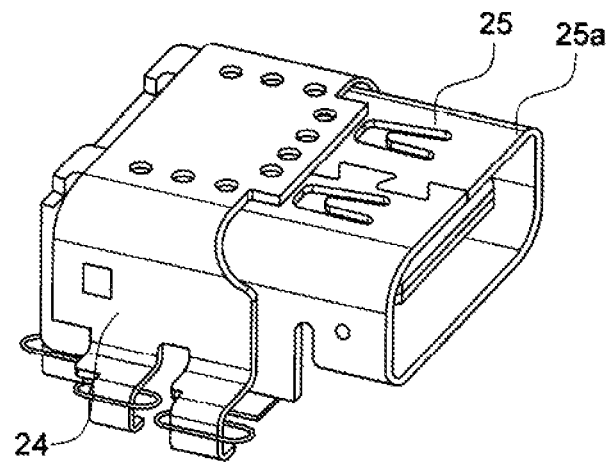
FIGS. 10C and 10D show a modification to a conventional USB-C socket to provide greater clearance for the locking elements of the CWedge Lock locking elements.
Figure 10D:
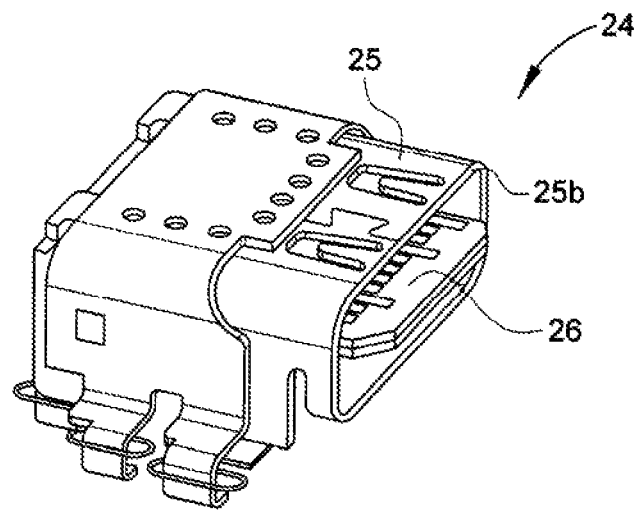

FIG. 10A illustrate the mobile device 1 with the top wall removed to show the position/location of the USB-C socket 24 adjacent the port opening 22, with the lock 151 on the opposite side, juxtaposed to the socket 24. Mostly importantly, note the extreme thinness "w" of the outer wall 21 which is just about 2 mm thick and sufficient to generate the holding power on the lock's locking elements 152, 154. See also FIG. 10B. In accordance with a preferred embodiment and if desired, the shroud/housing 25 formed around the PCB 26 of the socket 24 has a forward edge 25a that in some devices protrudes into the slot 22. To provide sufficient room and prevent clashes, that edge 25a is cut back a millimeter or so as shown in FIG. 10D.

FIG. 11 shows the CWedge slot 40 as seen from inside the device 1. Relative to the notional center line 1043c of the slot 40, the angular extension can be anywhere between the arc angles 1043a (about 120 degrees) and 1043b (180 degrees). Of course, the 180 arc angle is preferred because it provides the greatest lock holding power.

The modified security slot 1240 of FIG. 12 serves the same function and has the general structure, location and purpose (and advantages) of the slot 40, except for adding holding strength by providing additional slanted interior surfaces 1243c (at the top) and 1243d (at the bottom) of the slot, preferably over only the left section of the slot, for example over more than 60 percent of the horizontal extension of the slot. The sidewalls of the slot 1240 has the slanted surfaces 1243a and 1243b, as in the slot 40.

Significantly, the upper and bottom contours of the opening 1242 (into the slot 1240) contains slits or channels 1242a (six such slits are shown) the purpose of which is to enable passage of the novel locking element 1252 shown in FIG. 13A into the slot 1240. In FIG. 13A, the locking element 1352 is generally similar to the locking element 52, except that it includes projecting ramps 1352a (six are shown by way of example) that align with the slits 1242a so that the locking element 1352 can be initially pushed into the slot opening 1242 (which is actually narrower than the end-to-end dimension (thickness) of the locking element at the location of the ramps 1352a). Once the ramps 1352a are pushed into the slits 1242a, the entire locking element 1352 is able to slide in the slot 1240 leftwards (in the FIG. 12 embodiment), thereby placing and locking the slanted surface 1352g under the slanted surface 1243a (of the slot 1240) and, moreover, placing and locking the six ramps 1352a under the interior slanted surfaces 1243c of the slot. The projections 1352a may be shorted as indicated. In this position, attempting to pull the locking element 1352 out is rendered impossible, owing to its being locked at the left, top and bottom edges thereof to the corresponding and shape-matched slanted surfaces (or undercuts) 11243c, 1243d of the slot 1240.

To complete the locking operation, the second locking element 1354 is pushed into the slot 1240 (diagonally as previously described). Preferably, the right end surface 1352b of the locking element 1352 is arcuately shaped and so is the left end surface 1354b of the sliding (or rotatable) locking element 1354, with these surfaces being shape-matched for intimate contact. In this embodiment, the locking function is stronger owing to the additional holding in the slot provided by the slanted surfaces 1243c and the ramps 1352a. Also, because the lock body has the surface 55 (FIG. 5) which tightly abuts against the wall surface 20 (FIG. 3) in which the slot 1240 is formed, the overall lock body is prevented from being giggled horizontally or vertically, which thwarts attempts to loosen the lock out of the slot by forceful side to side or up and down twisting of the lock body.

In FIGS. 12 and 13A, the widths of the slits 1242a and ramps 1352a may be about 1.5 mm, but that dimension can be further optimized. Of significance however is the fact that the present invention effects the security lock function with locking elements that extend into the slot for not more than 2.0 to 2.25 mm (+/−.2 mm). preferably not more than 2.0 mm, which conventional wisdom in the art would deem impossible in the context of the locking needs for a security slot. Secondly, the present invention provides that function in the existing opening of a USB plug opening, which is given dual functions of serving as the plug opening (into the USB-C socket inside) or as a security slot. Another important aspect of the present security locks is that their locking elements do not protrude into the electronic device beyond the rear surface of the outer wall of the MED.

In the further security lock embodiment of FIG. 14, the lock head 1450 is provided with a first locking element 1452a (which has an outward extension of about 2.0 mm), a second, slidable locking element 1452b that is configured to slide on a rail 1452d inside the body of the lock head 1450, against the force of the spring 1452e which biases it to move to the left to contact the first locking element 1452a. Thereby, the combined left to right extension of the two locking elements is a shade smaller than the opening size into the slot 40. However, once inserted, the third locking pin 1454 is either pushed or screwed into the slot pushing the locking elements 1452a and 1452b apart, effecting the locking function. Although not strictly needed, the left locking element 1452a may also be mounted in the body of the lock head 1450 on a rail 1452c, so that the lock head does not need to be moved relative to the outer wall 20 of the electronic device. In FIG. 14, the depth of the slot 1440 is indicated by "ds" and is identical to the length "dl" of the locking elements 1452a and 1452b.

Figures 15A, 15B:
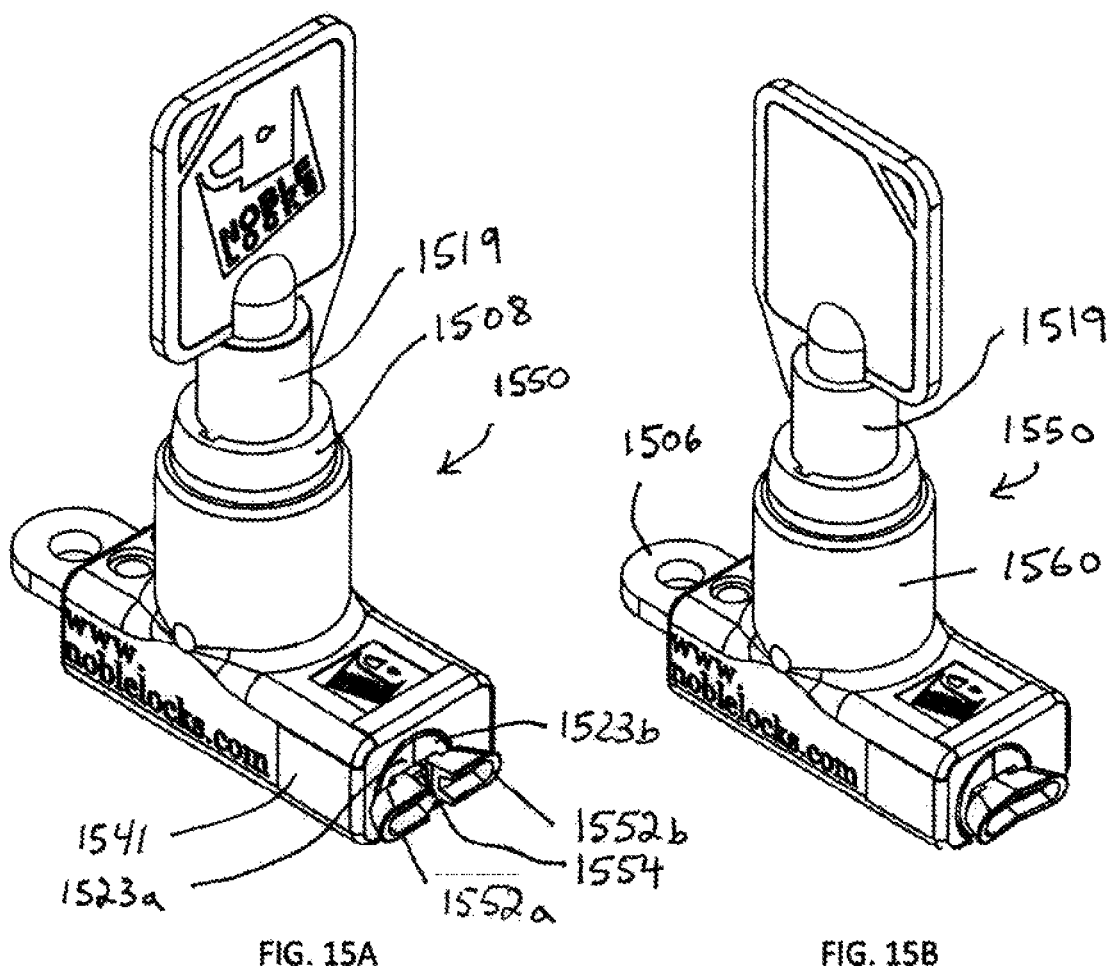
FIGS. 15A and 15B show a CWedge Lock embodiment that has been reduced to practice, employing the locking principle illustrated in FIG. 14.
Figure 15C:
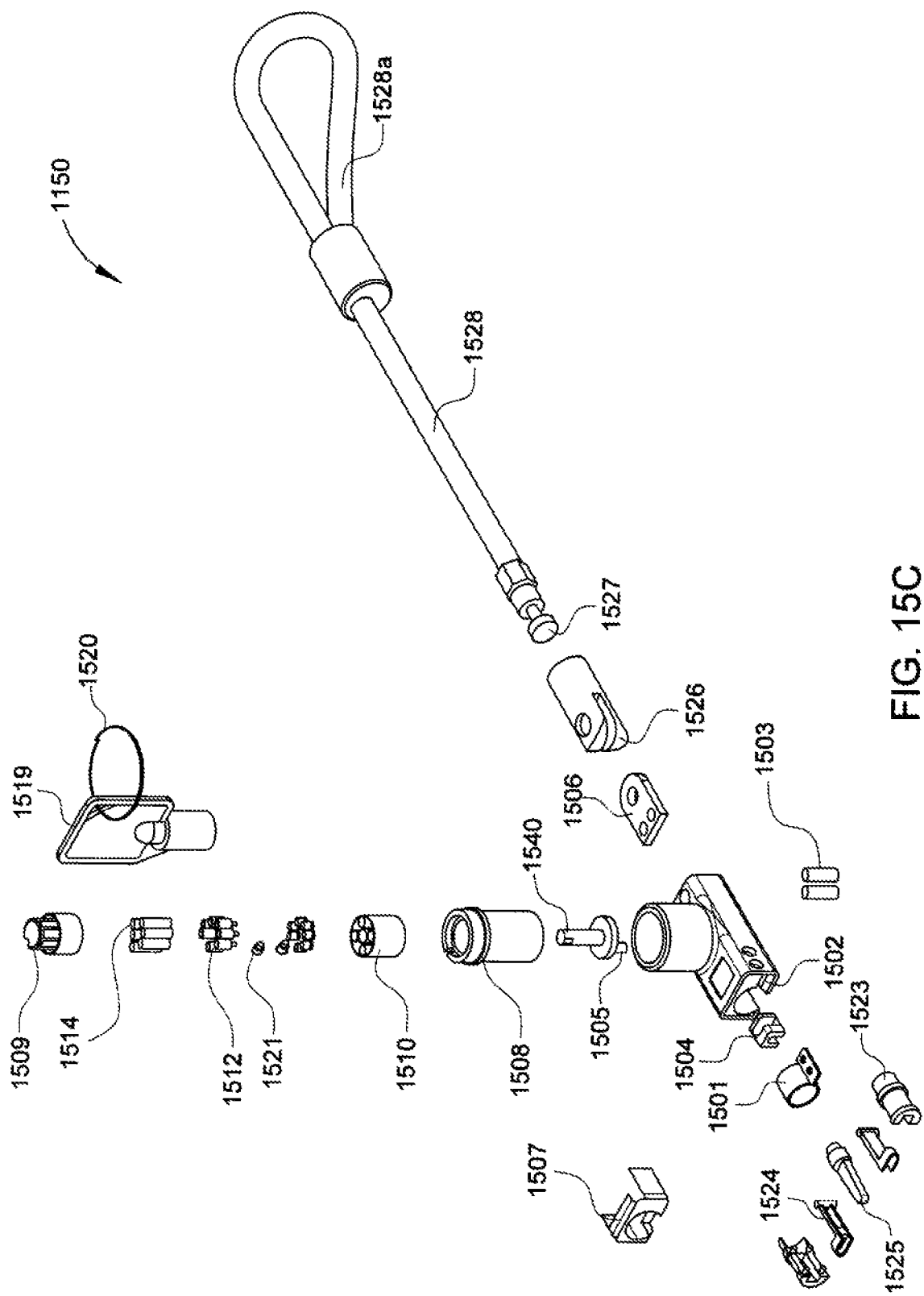
FIGS. 15C and 15D are exploded views of the internal components of the lock embodiment of FIG. 15A.
Figure 15D:
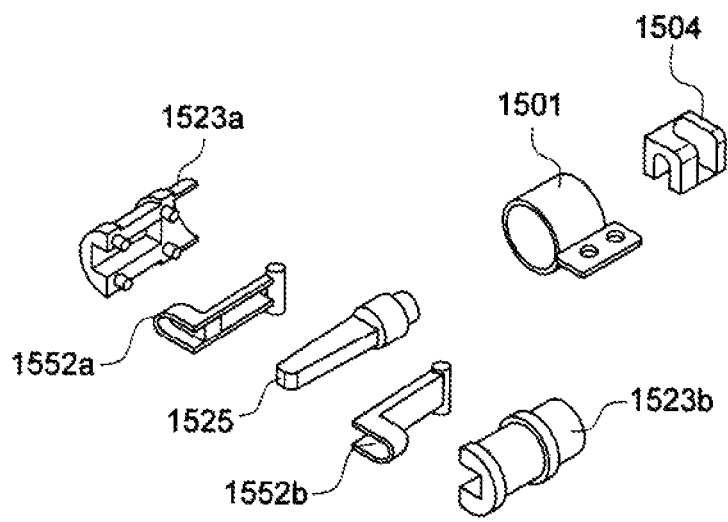
Figure 15E:
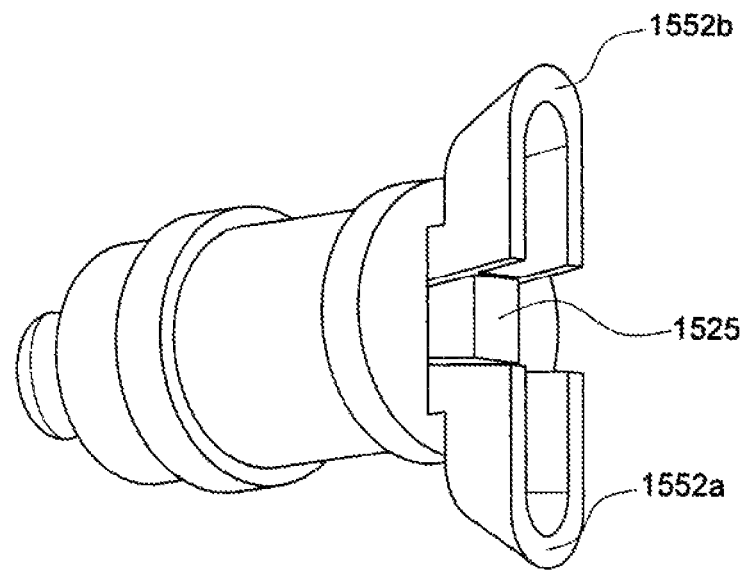
FIG. 15E shows the locking elements arrangement of FIG. 15A.

The present inventor has reduced to practice a CWedge Lock embodiment that uses the locking concept shown in FIG. 14, which is described below by reference to FIGS. FIGS. 15A through 15D. In FIGS. 15A and 15B, the lock 1550 has a body or housing 1541 supporting a lock cylinder housing 1560, enabling operating the lock 1550 via key 1519. The cable coupling tab 1506 provides the means to attach the cable 1528 (FIG. 15C). The locking components that provide the means to secure the lock 1550 to the CWedge Slot comprise first locking element 1552a, second locking element 1552b and the locking pin or shaft 1554 that is configured to move between (whether by sliding into or out of the lock housing or by rotating eccentrically therebetween) the locking elements 1552a, 1552b, to selectively tightly wedge (FIG. 15A) the locking elements in the security slot, or un-wedge them as shown in FIG. 15B. The locking elements 1552a, 1552b and the shaft/tab 1554 are encased in a two-part round shroud 1523a, 1523b, enabling the locking elements to rotate relative to the lock body 1541 for the purpose of preventing attempts to forcibly turn the lock body to break its coupling from the locking elements, as previously described.

In the exploded view of FIG. 15C, the CWedge Lock 1550 is illustrated to include the lock body 1541, to which the cable 1528 with its loop 1528a is coupled/attached via the cable coupling 1526 that is attachable to the tab 1506 that is attached by irremovable pins to the lock body 1541. The combination of the parts 1526, 1527 enable the cable to move sidewise as well as to rotate relative to the lock body 1541.

The lock housing 1560 is sized to receive and support the lock cylinder components including the locking components 1509, 1514, 1512, 1521 and 1510 that are collectively housed in the cylinder body 1508. The lock operator 1540 is capable of being turned 90 degrees with the key 1590 (the key ring is 1520). The rotation of the operator 1540 is designed to cause the coupling 1504 to move axially (in a forward/backward direction) inside the body 1541, by means of rotation of the eccentrically located pin 1505 inside the channel 1504a of the coupling 1504. In addition, the ring neck 1504b of the coupling 1504 holds onto the locking element assembly in a manner that enables the locking element assembly to rotate relative to the lock body 1540. The overall design is extremely compact, the lock housing having width, length and height dimensions of about 12 mm, 26 mm and 8 mm, respectively. More importantly, the height of the locking elements above the bottom surface 1541a (FIG. 15A) of the lock body barely exceeds 2 mm (in the embodiment shown it is 2.14 mm) and the "thickness" of the locking elements 1552a, 1552b is also about 2 mm (in the shown embodiment 2.32 mm), protruding from the front surface by about 2 mm (matching the depth of the CWedge Slot).

While the above description has focused on providing the CWedge Slot at the location of the conventional USB-C socket, in fact the novel security slot herein can be formed anywhere available on any of the outer wall(s) of the electronic device and utilized for insertion of the locking elements described above. It is of no concern that the CWedge Slot might be blocked on the inside by structures inside the EMD 1, for the locking concept described herein requires no more than a groove that is about 2 mm deep anywhere on the outer wall of the EMD 1. The CWedge Slot is preferably fabricated at the time of the fabrication of the outer wall, but the invention is equally available by retrofitting existing devices with the CWedge Slot described herein.

Figure 16A:
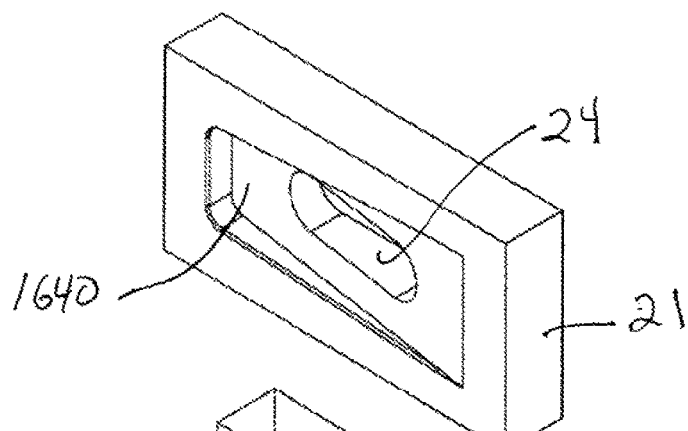
FIGS. 16A, 16B and 16C show another security slot embodiment according to the present disclosure.
Figure 16B:
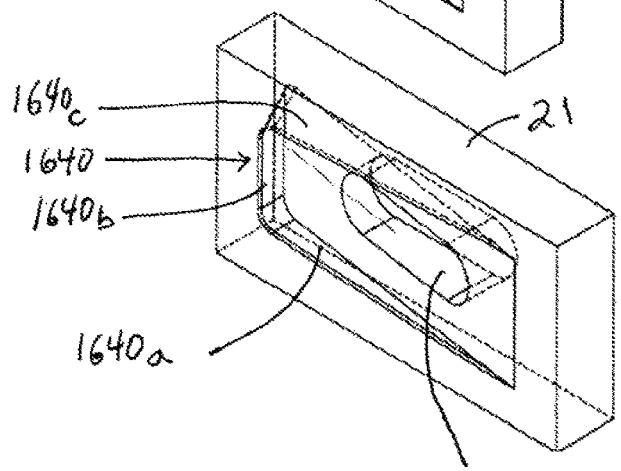
Figure 16C:
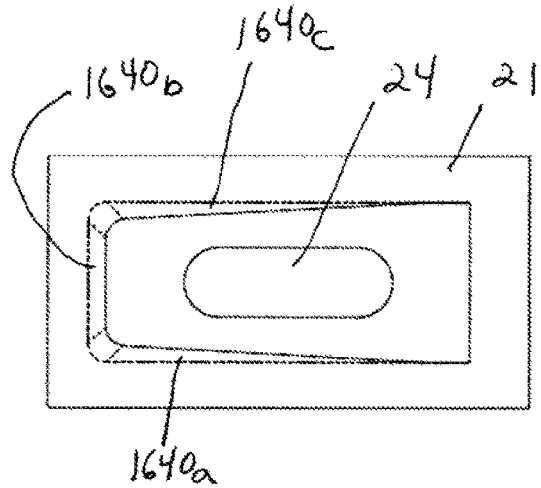

According to the embodiment of FIGS. 16A through 16C, a security slot is formed in the outer wall 21 of the EMD 1 which surrounds the USB-C port 24. The security slot is carved into the front face of the outer wall 21 and is defined by three inclined surfaces (or undercuts) 1640a, 1640b and 1640c. These undercut surfaces act or function similarly to the arcuately-shaped side walls described above. As one proceeds from right to left in the figures, the depth of the cutouts into the thickness dimension of the wall 21 increases, so that the depth is highest at the left side. Regardless, the security slot 1640 has three undercuts, one above, one below and one to the left of the port 24, as shown. These undercuts allow the lock shown in FIGS. 17A and 17B to grasp onto and hold tightly to the wall 21.

Figure 17A:
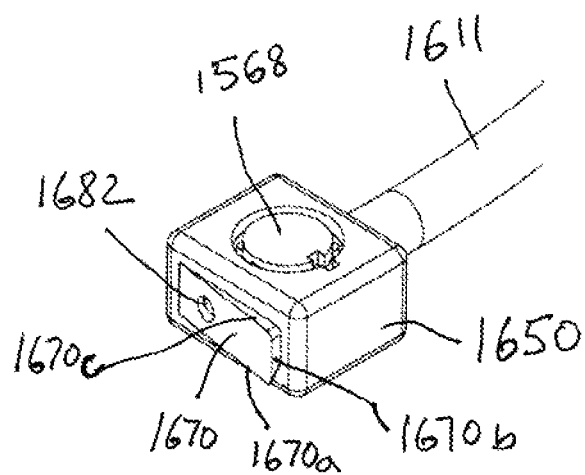
FIGS. 17A and 17B show a wedge lock embodiment for the security slot of FIGS. 16A through 16C.
Figure 17B:
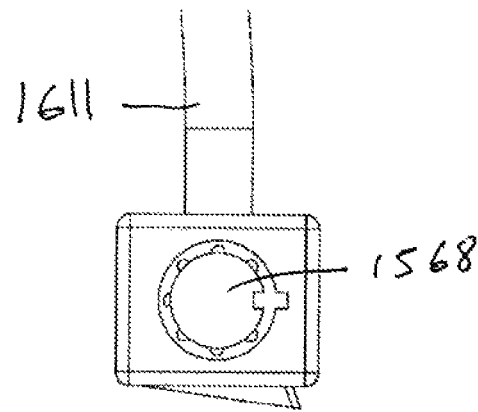
Figure 17C:
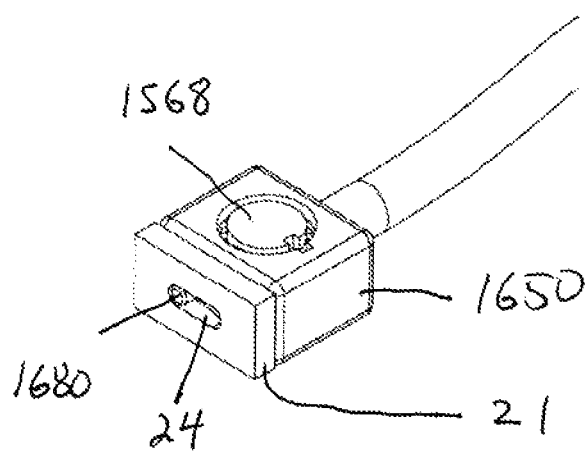
FIG. 17C shows the wedge lock and security slot of FIGS. 16A through 17B intercoupled with each other.

Thus, the wedge style lock 1650 of FIGS. 17A and 17B has a lock body 1560 with an attached securing cable 1611 and a lock cylinder 1568, as is conventional for locks of this type. In departure from the prior art the lock body supports on a front side thereof a single locking element 1670 that is formed with inclined surfaces 1670a, 1670b and 1670 that precisely match and complement the contours or shapes of the inclined security surfaces 1640a, 1640b and 1640c, respectively. In use, the locking element 1670 is slid against the security slot 1640, enabling the locking element 1670 to slide under the inclined undercuts 1640a, b and c. To complete the locking operation, the lock cylinder is operated (using a key inserted in the key-slot 1568) to cause the locking pin 1680 (FIG. 17C) to move from inside the lock body 1650 and into the right side of the port 24. In this position, the lock 1650 cannot be slid to right and the lock remains firmly affixed to the EMD 1 that has been provided with the security slot 1640. The advantage here is that the lock body is held to the wall 21 from three directions, from above and below and from the left side.

While the embodiment of FIGS. 16A through 17C has been described as being formed around and in association with an electrical port of the EMD 1, it obviously can be provided anywhere around the peripheral outer wall of the EMD, not over an electrical port of the EMD. It also provides the benefit of a security slot that does not need to penetrate through the outer wall 21, thereby avoiding the risk of foreign matter, e.g., water or humidity finding its way into the interior of the EMD. Further, the security cavities described herein can be formed in a thin slab of metal and then glued or screwed or otherwise affixed to the outer sidewall of the EMD.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An electronic mobile device (EMD) including a security facility that enables the EMD to be tethered to an immobile object to prevent theft of the EMD, the EMD comprising:

a housing defining an interior that holds electrical components and circuits of the EMD, said housing being partially defined by an outer wall that is made of metal and has a wall thickness of less than 2.3 mm, an outside surface and an inside surface of said outer wall both extending parallel to a flat plane associated with the outer wall;

an electrical port comprising a generally rectangular port slot formed in the outer wall and an electrical connector located inside the housing juxtaposed to the port slot, the port slot being defined by an elongate upper wall edge, an elongate lower wall edge, a left side, arcuate wall edge and a right side, arcuate wall edge, the four edges defining a security port slot configured to receive locking elements of a lock assembly;

wherein the upper and lower wall edges extend perpendicularly to the plane of the outer wall and the left and right side arcuate edges flair away from the outer surface of the outer wall and extend at angles in the range of 45 to 75 degrees relative to the plane of the outer wall, away from an ingress into the security port slot, and each arcuate edge extending between the lower and upper edges of the outer wall over an arc angle in the range of 120 to 180 degrees, each of the arcuate edges being defined by a respective interior surface shape; and wherein the arcuate edges are formed so that a pair of said locking elements associated with a lock body that have outer surfaces that complementarily match the surface shapes of the arcuate edges are capable of being inserted into the port slot and hold onto the outer wall when being pulled out by a force greater than 100 pounds.

2. The EMD of claim 1, wherein the arc angle extension of each of the arcuate edges is between 160 to 180 degrees.

3. The EMD of claim 1, wherein the electrical connecter has a shroud that surrounds a PCB (printed circuit board) and the arcuate edges of the port are laterally spaced away from the shroud.

4. The EMD of claim 1, wherein the wall thickness of the outer wall is in a range from 1.9 to 2.25 mm.

5. The EMD of claim 1, wherein at least one of the locking elements is slidable within the security port slot to engage tightly one of said arcuate edges.

6. The EMD of claim 1, wherein the arcuate edges are sufficiently sturdy as to retain the locking elements in the security port slot, without the locking elements protruding beyond the inside surface of the outer wall.

7. The EMD of claim 1, wherein the respective surface shapes of the arcuate edges are mirror images of each other.

8. The EMD of claim 1, including at least one slit in each of the upper and lower edges, so configured as to allow protrusions associated with the lock assembly to pass through the slits and then be inserted into the upper and lower edges to improve the holding power of the security port slot on the lock assembly.

9. The EMD of claim 8, including at least two of said slits in each of said upper and lower edges of said security port slot.

10. The EMD of claim 1, wherein the lower edge is located at a height above a bottom surface of said EMD that is less than 2.5 mm.

11. The EMD of claim 1, wherein the EMD is a laptop.

12. The EMD of claim 1, wherein the metal of the outer wall is one of aircraft grade aluminum, magnesium, titanium, tungsten, chromium and a steel alloys that score very high on the Mohs and Vickers Scales.

13. The EMD of claim 1, wherein the electrical connector is a USB-C electrical socket.

14. The EMD of claim 1, in combination with a lock assembly comprising said locking elements.

15. The EMD of claim 14, wherein the locking elements comprise first and second locking elements that are insertable serially one after the other into said security port slot.

16. The EMD of claim 14, wherein the locking elements comprise first and second locking elements that are insertable together into the security port slot and including a third locking element located between the first and second locking elements.

17. An electronic mobile device (EMD) including a security facility that enables the EMD to be tethered to an immobile object to prevent theft of the EMD, the EMD comprising:
 a housing defining an interior that holds electrical components and circuits of the EMD, said housing being partially defined by an outer wall that is made of metal and has a wall thickness of less than 2.3 mm, an outside surface and an inside surface of said outer wall both extending parallel to a flat plane associated with the outer wall; and
 a security slot formed inside said outer wall, said security slot comprising first and second slits that are parallel to each other and extend obliquely into the thickness of the outer wall and a third slit that extends between and connects the first and second slits at a deeper end thereof, the first, second and third slits being configured to receive a locking element of a lock that is locatable on the outer surface of the outer wall and then slidable between the first and second slits and then into the third slit, and a locking hole formed in the outer wall adjacent the slits and configured to receive a locking pin insertable into it from the lock to prevent the lock element from being withdrawn in a locked state of the lock.

18. The EMD of claim 17, including an access opening to reach an electrical connector inside the EMD, and wherein the security slot is formed around said access opening.

19. The EMD of claim 18, wherein the electrical connector is a USB-C socket.

\* \* \* \* \*